United States Patent
Hsieh et al.

(10) Patent No.: US 9,638,894 B2
(45) Date of Patent: May 2, 2017

(54) PHOTOGRAPHING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventors: Dung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 127 days.

(21) Appl. No.: 14/490,779

(22) Filed: Sep. 19, 2014

(65) Prior Publication Data

US 2016/0048004 A1    Feb. 18, 2016

(30) Foreign Application Priority Data

Aug. 12, 2014 (TW) .............................. 103127643 A

(51) Int. Cl.
*G02B 13/00* (2006.01)
*H04N 5/225* (2006.01)
*G02B 9/60* (2006.01)

(52) U.S. Cl.
CPC ....... *G02B 13/0045* (2013.01); *H04N 5/2254* (2013.01); *G02B 9/60* (2013.01)

(58) Field of Classification Search
CPC .............................. G02B 9/60; G02B 13/0045
(Continued)

(56) References Cited

U.S. PATENT DOCUMENTS 3,472,577 A   10/1969   Rosin et al.
4,946,267 A    8/1990   Hoogland
(Continued)

FOREIGN PATENT DOCUMENTS

JP    2011227362       11/2011
TW    201415071 A      4/2014
(Continued)

OTHER PUBLICATIONS

English Abstract translation of JP2011227362 (Published Nov. 10, 2011).
(Continued)

*Primary Examiner* — Scott J Sugarman
*Assistant Examiner* — Gary O'Neill
(74) *Attorney, Agent, or Firm* — McClure, Qualey & Rodack, LLP

(57) ABSTRACT

A photographing optical lens assembly includes, in order from an object side to an image side, a first lens element, a second lens element, a third lens element, a fourth lens element and a fifth lens element. The first lens element with positive refractive power has a convex object-side surface. The second lens element with negative refractive power has a concave image-side surface. The third lens element with positive refractive power has a convex object-side surface and a convex image-side surface. The fourth lens element with refractive power has a convex object-side surface and a concave image-side surface, wherein the surfaces thereof are aspheric. The fifth lens element with refractive power has a convex object-side surface, and an image-side surface being concave in a paraxial region thereof and having at least one convex shape in an off-axial region thereof, wherein the surfaced thereof are aspheric.

24 Claims, 19 Drawing Sheets

(58) Field of Classification Search
USPC ........ 359/659, 714, 746, 753, 763, 764, 766
See application file for complete search history.

(56) References Cited

U.S. PATENT DOCUMENTS

| | | | |
|---|---|---|---|
| 4,993,817 | A | 2/1991 | Hoogland |
| 8,508,859 | B2* | 8/2013 | Tsai .................. G02B 13/0045 |
| | | | 359/708 |
| 8,810,923 | B2 | 8/2014 | Shinohara |
| 2010/0220229 | A1* | 9/2010 | Sano .................. G02B 13/0045 |
| | | | 348/340 |
| 2013/0258499 | A1 | 10/2013 | Hashimoto |
| 2014/0015991 | A1 | 1/2014 | Yamada et al. |
| 2014/0015997 | A1 | 1/2014 | Baba |
| 2014/0049839 | A1 | 2/2014 | Shinohara |
| 2015/0077863 | A1 | 3/2015 | Shinohara et al. |
| 2015/0185436 | A1 | 7/2015 | Park |
| 2015/0185442 | A1 | 7/2015 | Katsuragi et al. |
| 2015/0338608 | A1* | 11/2015 | Takei ................. G02B 13/0045 |
| | | | 348/360 |

FOREIGN PATENT DOCUMENTS

| | | |
|---|---|---|
| WO | 2013014850 | 1/2013 |
| WO | 2013063097 | 5/2013 |
| WO | 2013175782 | 11/2013 |
| WO | 2014-045686 A1 | 3/2014 |
| WO | 2014050476 | 4/2014 |
| WO | 2014080561 | 5/2014 |

OTHER PUBLICATIONS

English Abstract translation of WO2013063097 (Published May 2, 2013).

English Abstract translation of WO2013175782 (Published Nov. 28, 2013).

English Abstract translation of WO2014050476 (Published Apr. 3, 2014).

English Abstract translation of WO2014080561 (Published May 30, 2014).

* cited by examiner

PHOTOGRAPHING OPTICAL LENS ASSEMBLY, IMAGE CAPTURING DEVICE AND ELECTRONIC DEVICE

RELATED APPLICATIONS

This application claims priority to Taiwan Application Serial Number 103127643, filed Aug. 12, 2014, which is herein incorporated by reference.

BACKGROUND

Technical Field

The present disclosure relates to a photographing optical lens assembly and an image capturing device. More particularly, the present disclosure relates to a compact photographing optical lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure enhance image quality and resolution. However, the surface shape of the lens elements is not favorable for moldability of the lens element and would provide excessive photosensitivity, so that the optical system cannot be applied to high resolution image sensor. It is thereby not favorable for providing high image quality.

SUMMARY

According to one aspect of the present disclosure, a photographing optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an image-side surface being concave in a paraxial region thereof. The third lens element with positive refractive power has an object-side surface being convex in a paraxial region thereof and an image-side surface being convex in a paraxial region thereof. The fourth lens element with refractive power has an object-side surface being convex in a paraxial region thereof and an image-side surface being concave in a paraxial region thereof, wherein the object-side surface and the image-side surface of the fourth lens element are aspheric. The fifth lens element with refractive power has an object-side surface being convex in a paraxial region thereof, and an image-side surface being concave in a paraxial region thereof and having at least one convex shape in an off-axial region thereof, wherein the object-side surface and the image-side surface of the fifth lens element are aspheric. The photographing optical lens assembly has a total of five lens elements with refractive power, there is an air gap in a paraxial region between any two of the first lens element, the second lens element, the third lens element, the fourth lens element, and the fifth lens element that are adjacent to each other. When a curvature radius of the object-side surface of the first lens element is R1, a curvature radius of the image-side surface of the second lens element is R4, a curvature radius of the object-side surface of the third lens element is R5, a curvature radius of the image-side surface of the third lens element is R6, a central thickness of the fourth lens element is CT4, a central thickness of the fifth lens element is CT5, and an Abbe number of the fourth lens element is V4, the following conditions are satisfied:

$-1.0<(R5+R6)/(R5-R6)<0.20;$ $R4/R1<3.5;$ $CT5/CT4<1.75;$ and $V4<35.$

According to another aspect of the present disclosure, an image capturing device includes the photographing optical lens assembly according to the aforementioned aspect and an image sensor, wherein the image sensor is located at the image side of the photographing optical lens assembly.

According to further another aspect of the present disclosure, an electronic device includes the image capturing device according to the aforementioned aspect.

According to yet another aspect of the present disclosure, a photographing optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an image-side surface being concave in a paraxial region thereof. The third lens element with positive refractive power has an object-side surface being convex in a paraxial region thereof and an image-side surface being convex in a paraxial region thereof. The fourth lens element with refractive power has an object-side surface being convex in a paraxial region thereof and an image-side surface being concave in a paraxial region thereof, wherein the object-side surface and the image-side surface of the fourth lens element are aspheric. The fifth lens element with refractive power has an object-side surface being convex in a paraxial region thereof, and an image-side surface being concave in a paraxial region thereof and having at least one convex shape in an off-axial region thereof, wherein the object-side surface and the image-side surface of the fifth lens element are aspheric. The photographing optical lens assembly has a total of five lens elements with refractive power, there is an air gap in a paraxial region between any two of the first lens element, the second lens element, the third lens element, the fourth lens element, and the fifth lens element that are adjacent to each other. When a curvature radius of the object-side surface of the first lens element is R1, a curvature radius of the image-side surface of the second lens element is R4, a curvature radius of the object-side surface of the third lens element is R5, a curvature radius of the image-side surface of the third lens element is R6, a central thickness of the fourth lens element is CT4, a central thickness of the fifth lens element is CT5, an axial distance between the third lens element and the fourth lens element is T34, and an axial distance between the fourth lens element and the fifth lens element id T45, the following conditions are satisfied:

$-1.0<(R5+R6)/(R5-R6)<0.20;$ $R4/R1<3.5;$ $CT5/CT4<1.75;$ and $2.75<T34/T45.$

According to still another aspect of the present disclosure, an image capturing device includes the photographing optical lens assembly according to the aforementioned aspect and an image sensor, wherein the image sensor is located at the image side of the photographing optical lens assembly.

According to further another aspect of the present disclosure, an electronic device includes the image capturing device according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
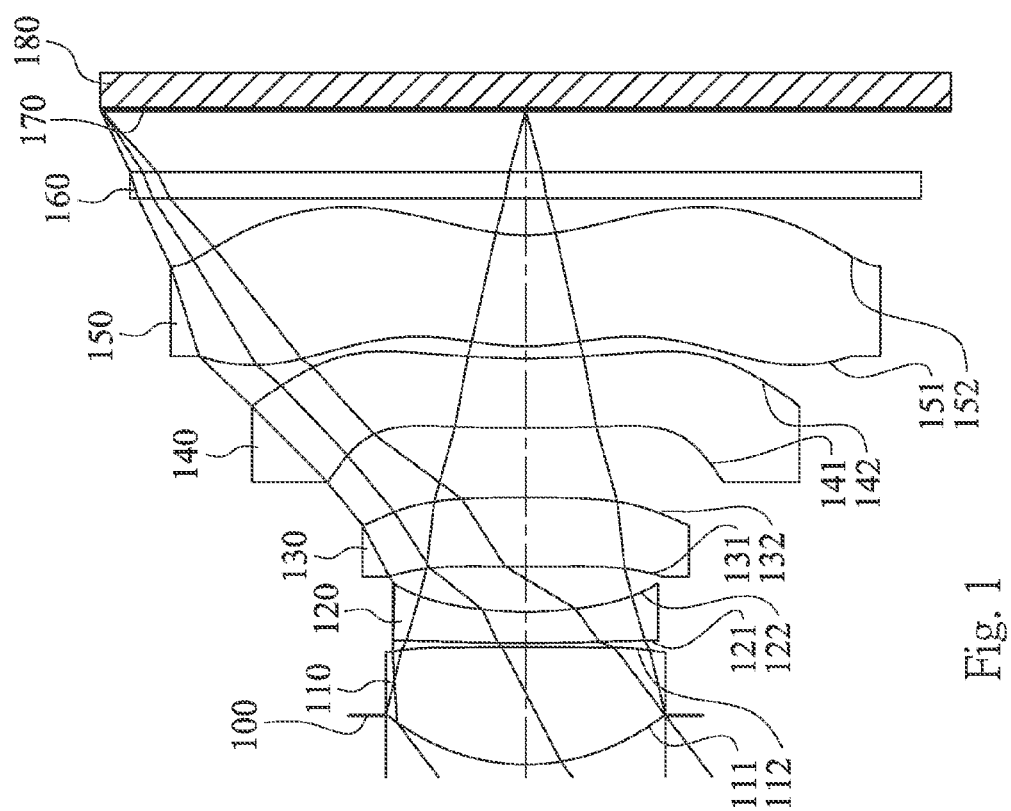
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element and a fifth lens element. The photographing optical lens assembly has a total of five lens elements with refractive power.

There is an air gap in a paraxial region between any two of the first lens element, the second lens element, the third lens element, the fourth lens element, and the fifth lens element that are adjacent to each other. That is, each of the first through fifth lens elements is a single and non-cemented lens element, and any two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element and the fifth lens element of the photographing optical lens assembly, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, according to the photographing optical lens assembly of the present disclosure, an air gap in a paraxial region between any two of the first lens element, the second lens element, the third lens element, the fourth lens element, and the fifth lens element that are adjacent to each other of the present disclosure improves the problem generated by the cemented lens elements.

The first lens element with positive refractive power has an object-side surface being convex in a paraxial region thereof. Therefore, the desired positive refractive power can be provided and the total track length of the photographing optical lens assembly can be reduced.

The second lens element with negative refractive power has an image-side surface being concave in a paraxial region thereof. Therefore, the aberration of the photographing optical lens assembly can be corrected for enhancing the image quality.

The third lens element with positive refractive power has an object-side surface being convex in a paraxial region thereof and an image-side surface being convex in a paraxial region thereof. Therefore, the distribution of the positive refractive power of the photographing optical lens assembly can be balanced, so that the photosensitivity thereof can be reduced and the spherical aberration thereof can be corrected. Moreover, an off-axial region of the object-side surface of the third lens element is closer to the object side than a paraxial region of the object-side surface of the third lens element. Hence, the peripheral aberration of the photographing optical lens assembly can be corrected.

The fourth lens element can have negative refractive power and has an object-side surface being convex in a paraxial region thereof and an image-side surface being concave in a paraxial region thereof. Therefore, the astigmatism of the photographing optical lens assembly can be corrected for maintaining good image quality. Furthermore, an off-axial region of the image-side surface of the fourth lens element has at least one convex shape, so that the incident angle of the off-axis field onto an image sensor can be effectively reduced, and the receiving efficiency of the image sensor can be increased.

The fifth lens element has an object-side surface being convex in a paraxial region thereof and an image-side surface being concave in a paraxial region thereof. Therefore, the astigmatism of the photographing optical lens assembly can be further corrected for enhancing the image quality. Moreover, an off-axial region of the image-side surface of the fifth lens element has at least one convex shape, so that it is favorable for further correcting the aberration of the off-axis field, and the image quality can be enhanced.

When a curvature radius of the object-side surface of the third lens element is R5, and a curvature radius of the image-side surface of the third lens element is R6, the following condition is satisfied: $-1.0 < (R5+R6)/(R5-R6) < 0.20$. It is favorable for reducing the photosensitivity of the photographing optical lens assembly and decreasing the spherical aberration thereof. Preferably, the following condition can be satisfied: $-1.0 < (R5+R6)/(R5-R6) < 0$.

When a curvature radius of the object-side surface of the first lens element is R1, and a curvature radius of the image-side surface of the second lens element is R4, the following condition is satisfied: $R4/R1 < 3.5$. Therefore, the aberration of the photographing optical lens assembly can be corrected for enhancing the image quality. Preferably, the following condition can be satisfied: $1.0 < R4/R1 < 2.5$.

When a central thickness of the fourth lens element is CT4, and a central thickness of the fifth lens element is CT5, the following condition is satisfied: $CT5/CT4 < 1.75$. Therefore, the moldability and homogeneity of the lens elements can be enhanced.

When an Abbe number of the fourth lens element is V4, the following condition is satisfied: $V4 < 35$. Therefore, the chromatic aberration of the photographing optical lens assembly can be corrected for increasing the chromatic fidelity of the image.

When an axial distance between the third lens element and the fourth lens element is T34, and an axial distance between the fourth lens element and the fifth lens element is T45, the following condition is satisfied: $2.75 < T34/T45$. Therefore, the yield ratio of the lens assembling can be increased by the proper arrangement of the axial distance between the lens elements. Preferably, the following condition can be satisfied: $3.0 < T34/T45 < 15$.

When a curvature radius of the image-side surface of the fourth lens element is R8, and a curvature radius of the object-side surface of the fifth lens element is R9, and the following condition is satisfied: $2.0 < |R8|/R9$. Therefore, the astigmatism of the photographing optical lens assembly can be corrected and the photosensitivity thereof can be decreased by the proper surface shape of the lens elements.

When a focal length of the photographing optical lens assembly is f, a focal length of the fourth lens element is f4, and a focal length of the fifth lens element is f5, the following condition is satisfied: $|f/f4|+|f/f5| < 0.60$. Therefore, the photosensitivity of the photographing optical lens assembly can be decreased for applying to the image sensor with high resolution.

When an Abbe number of the third lens element is V3, the following condition is satisfied: $V3 < 35$. Therefore, the chromatic aberration of the photographing optical lens assembly can be further corrected.

When an Abbe number of the second lens element is V2, the Abbe number of the third lens element is V3, the Abbe number of the fourth lens element is V4, and an Abbe number of the fifth lens element is V5, the following condition is satisfied: $80 < V2+V3+V4+V5 < 145$. Therefore, the distribution of the Abbe number of the photographing optical lens assembly can be balanced, and the chromatic aberration thereof can be corrected.

When an axial distance between the second lens element and the third lens element is T23, and a central thickness of the third lens element is CT3, the following condition is satisfied: $T23/CT3 < 0.72$. Therefore, the moldability and homogeneity of the lens elements can be enhanced, and the yield ratio of the lens assembling can be increased by the proper arrangement of the axial distance between the lens elements.

When the focal length of the photographing optical lens assembly is f, the curvature radius of the object-side surface of the third lens element is R5, and the curvature radius of the image-side surface of the third lens element is R6, the following condition is satisfied: $0 < (f/R5) - (f/R6) < 1.0$. Therefore, the spherical aberration of the photographing optical lens assembly can be corrected, and the photosensitivity thereof can be further reduced.

When the focal length of the photographing optical lens assembly is f, the following condition is satisfied: $2.5 \text{ mm} < f < 6.0 \text{ mm}$. Therefore, the total track length of the photographing optical lens assembly can be limited so as to maintain the compact size thereof.

According to the photographing optical lens assembly of the present disclosure, the lens elements thereof can be made of glass or plastic material. When the lens elements are made of glass material, the distribution of the refractive powers of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, the positive refractive power or the negative refractive power of a lens element or the focal length of the lens element, that is, refers to the refractive power or the focal length in a paraxial region of the lens element.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an image surface of the photographing optical lens assembly, based on the corresponding image sensor, can be flat or curved. For instance, the image surface can be a curved surface being concave facing towards the object side.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be optionally applied to moving focus optical systems, and is featured with good ability for correcting aberration and high image quality. The photographing optical lens assembly of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned photographing optical lens assembly and an image sensor. The image sensor is located at the image side of the photographing optical lens assembly. The shape of the third lens element and the fifth lens element of the photographing optical lens assembly and the low shape variation of the surface of the fourth lens element, the hard moldability, excessive photosensitivity which would limited the application of the high resolution image sensor can be avoided, and the excessive difference of the thickness between the center of the lens element and the spherical region of the lens element can be also avoided. Therefore, the photosensitivity can be reduced, and the image quality of the image capturing device can be enhanced. Preferably, the image capturing device can further include a barrel member, a holding member or a combination thereof.

According to the present disclosure, an electronic device is provided. The electronic device includes the aforementioned image capturing device. Therefore, the image sharpness can be enhanced while the compact size of the electronic device is maintained. Preferably, the electronic device can further include but not limited to a control unit, a display, a storage unit, a random access memory unit (RAM), a read only memory unit (ROM) or a combination thereof.

According to the above description of the present disclosure, the following 1st-11th specific embodiments are provided for further explanation.

1st Embodiment

Figure 2:
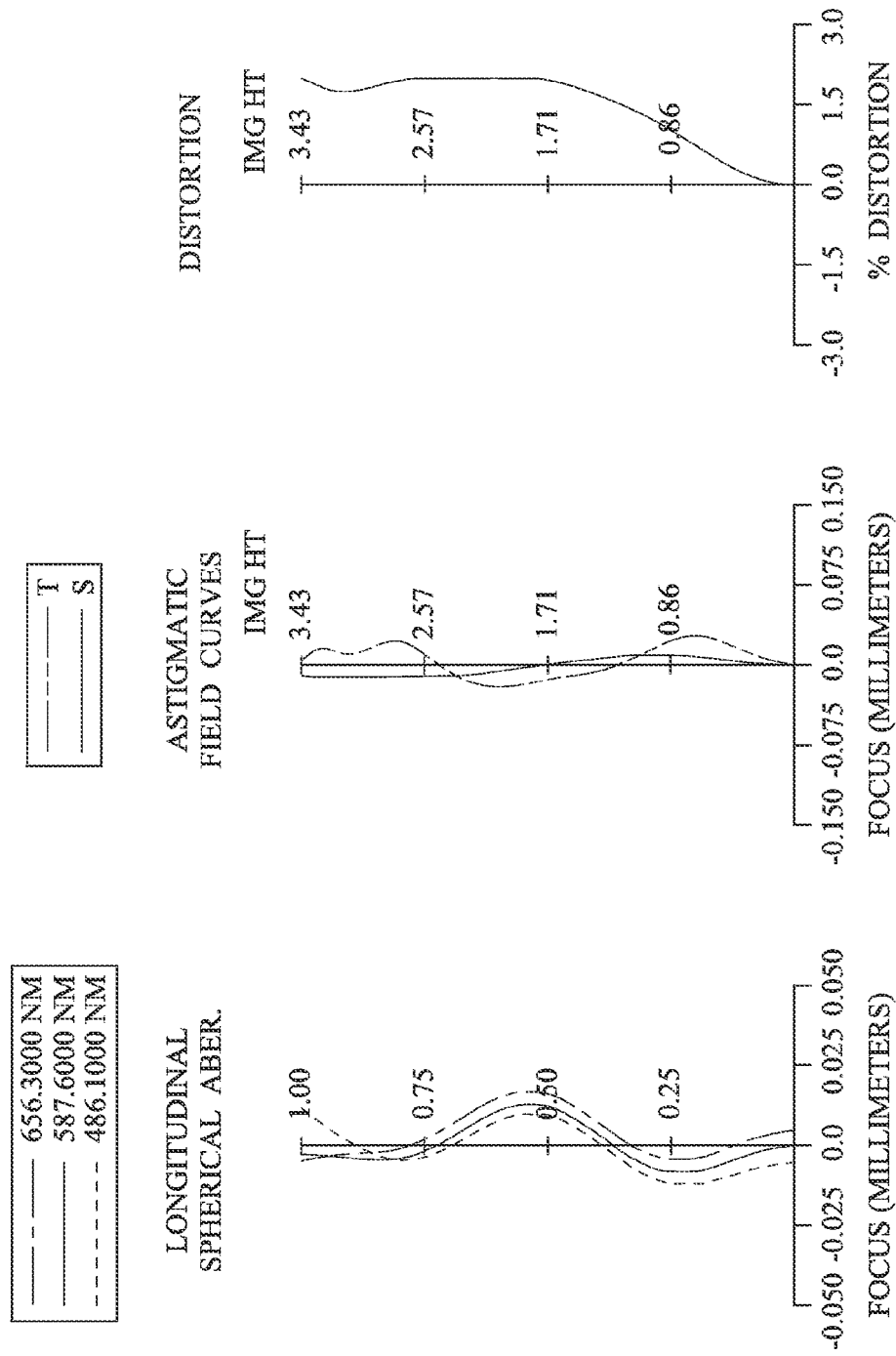
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical lens assembly (its reference numeral is omitted) and an image sensor 180. The photographing optical lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the image sensor 180 is located at the image side of the photographing optical lens assembly. The photographing optical lens assembly has a total of five lens elements (110-150) with refractive power, and there is an air gap in a paraxial region between any two of the first lens element 110, the second lens element 120, the third lens element 130, the fourth lens element 140, and the fifth lens element 150 that are adjacent to each other.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. Moreover, an off-axial region of the object-side surface 131 of the third lens element 130 is closer to the object side than the paraxial region of the object-side surface 131 of the third lens element 130.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Moreover, the image-side surface 142 of the fourth lens element 140 has at least one convex shape in an off-axial region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. Moreover, the image-side surface 152 of the fifth lens element 150 has at least one convex surface in an off-axial region thereof.

The IR-cut filter 160 is made of glass material and located between the fifth lens element 150 and the image surface 170, and will not affect a focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when the focal length of the photographing optical lens assembly is f, an f-number of the photographing optical lens assembly is Fno, and a half of a maximal field of view of the photographing optical lens assembly is HFOV, these parameters have the following values: f=4.43 mm; Fno=1.96; and HFOV=37.2 degrees.

In the photographing optical lens assembly according to the 1st embodiment, when an Abbe number of the second lens element 120 is V2, an Abbe number of the third lens element 130 is V3, an Abbe number of the fourth lens element 140 is V4, and an Abbe number of the fifth lens element 150 is V5, the following conditions are satisfied: V3=30.2; V4=23.5; and V2+V3+V4+V5=131.0.

In the photographing optical lens assembly according to the 1st embodiment, when a central thickness of the fourth lens element 140 is CT4, and a central thickness of the fifth lens element 150 is CT5, the following condition is satisfied: CT5/CT4=1.60.

In the photographing optical lens assembly according to the 1st embodiment, when an axial distance between the second lens element 120 and the third lens element 130 is T23, and a central thickness of the third lens element 130 is CT3, the following condition is satisfied: T23/CT3=0.65.

In the photographing optical lens assembly according to the 1st embodiment, when an axial distance between the third lens element 130 and the fourth lens element 140 is T34, and an axial distance between the fourth lens element 140 and the fifth lens element 150 is T45, the following condition is satisfied: T34/T45=5.86.

In the photographing optical lens assembly according to the 1st embodiment, when a curvature radius of the object-side surface 111 of the first lens element 110 is R1, and a curvature radius of the image-side surface 122 of the second lens element 120 is R4, the following condition is satisfied: R4/R1=1.80.

In the photographing optical lens assembly according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=0.12.

In the photographing optical lens assembly according to the 1st embodiment, when a curvature radius of the image-side surface 142 of the fourth lens element 140 is R8, a curvature radius of the object-side surface 151 of the fifth lens element 150 is R9, the following condition is satisfied: |R8|/R9=3.73.

In the photographing optical lens assembly according to the 1st embodiment, when the focal length of the photographing optical lens assembly is f, the curvature radius of the object-side surface 131 of the third lens element 130 is R5, and the curvature radius of the image-side surface 132 of the third lens element 130 is R6, the following condition is satisfied: (f/R5)−(f/R6)=0.49.

In the photographing optical lens assembly according to the 1st embodiment, when the focal length of the photographing optical lens assembly is f, a focal length of the fourth lens element 140 is f4, and a focal length of the fifth lens element 150 is f5, the following condition is satisfied: |f/f4|+|f/f5|=0.40.

The detailed optical data of the 1st embodiment are shown in Table 1 and the aspheric surface data are shown in Table 2 below.

TABLE 1

1st Embodiment
f = 4.43 mm, Fno = 1.96, HFOV = 37.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.399 | | | | |
| 2 | Lens 1 | 1.739 ASP | 0.950 | Plastic | 1.530 | 55.8 | 3.24 |
| 3 | | −107.689 ASP | 0.035 | | | | |
| 4 | Lens 2 | 17.797 ASP | 0.250 | Plastic | 1.650 | 21.5 | −5.87 |
| 5 | | 3.126 ASP | 0.366 | | | | |
| 6 | Lens 3 | 20.441 ASP | 0.560 | Plastic | 1.583 | 30.2 | 15.50 |
| 7 | | −16.061 ASP | 0.563 | | | | |
| 8 | Lens 4 | 61.904 ASP | 0.563 | Plastic | 1.639 | 23.5 | −13.43 |
| 9 | | 7.511 ASP | 0.096 | | | | |
| 10 | Lens 5 | 2.015 ASP | 0.900 | Plastic | 1.530 | 55.8 | −64.19 |
| 11 | | 1.608 ASP | 0.300 | | | | |
| 12 | IR-cut filter | Plano | 0.210 | Glass | 1.517 | 64.2 | — |

TABLE 1-continued

1st Embodiment
f = 4.43 mm, Fno = 1.96, HFOV = 37.2 deg.

| Surface # | | Curvature Radius | Thickness | Material | Index | Abbe # | Focal Length |
|---|---|---|---|---|---|---|---|
| 13 | | Plano | 0.508 | | | | |
| 14 | Image | Plano | — | | | | |

Note:
Reference wavelength is 587.6 nm (d-line).
Effective radius of Surface 5 is 1.060 mm.

TABLE 2

Aspheric Coefficients

| | Surface # | | | | |
|---|---|---|---|---|---|
| | 2 | 3 | 4 | 5 | 6 |
| k = | −3.7512E−03 | −1.0000E+00 | −9.0000E+01 | −4.1417E+01 | −3.5955E+00 |
| A4 = | 3.6848E−03 | −9.0294E−02 | −1.1135E−01 | 1.0975E−01 | −7.7263E−02 |
| A6 = | −3.1035E−02 | 4.2594E−01 | 4.8198E−01 | −3.5245E−02 | 5.1723E−02 |
| A8 = | 7.9029E−02 | −8.7253E−01 | −9.3827E−01 | −4.9575E−02 | −1.5589E−01 |
| A10 = | −1.0293E−01 | 8.8804E−01 | 9.6282E−01 | 1.4756E−01 | 2.2873E−01 |
| A12 = | 6.5236E−02 | −4.7007E−01 | −5.1746E−01 | −1.2966E−01 | −1.8130E−01 |
| A14 = | −1.7370E−02 | 1.0003E−01 | 1.1410E−01 | 4.7283E−02 | 5.8617E−02 |

| | Surface # | | | | |
|---|---|---|---|---|---|
| | 7 | 8 | 9 | 10 | 11 |
| k = | −9.0000E+01 | −6.8947E+01 | −3.0724E+01 | −2.6187E+00 | −1.1221E+00 |
| A4 = | −3.3190E−02 | 9.5343E−02 | 1.0301E−02 | −2.3447E−01 | −1.8091E−01 |
| A6 = | −9.6424E−02 | −1.4742E−01 | −2.3333E−02 | 1.0724E−01 | 7.6484E−02 |
| A8 = | 1.3791E−01 | 7.3455E−02 | 6.3412E−03 | −3.0603E−02 | −2.5451E−02 |
| A10 = | −1.2873E−01 | −2.1880E−02 | −1.7112E−03 | 5.9532E−03 | 5.6232E−03 |
| A12 = | 7.4740E−02 | −5.1405E−05 | 3.8458E−04 | −7.3274E−04 | −7.5041E−04 |
| A14 = | −2.5523E−02 | 9.0656E−04 | −3.3367E−05 | 5.0479E−05 | 5.4047E−05 |
| A16 = | 4.5425E−03 | | | −1.4733E−06 | −1.5953E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
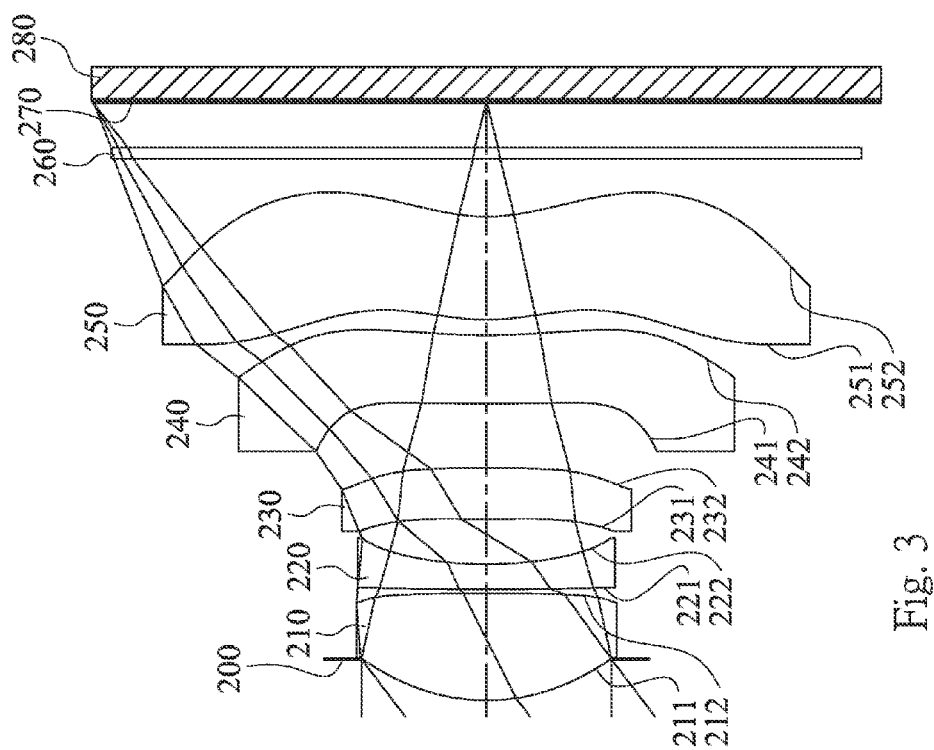
FIG. 3 is a schematic view of an image capturing device according to the 2nd embodiment of the present disclosure.
Figure 4:
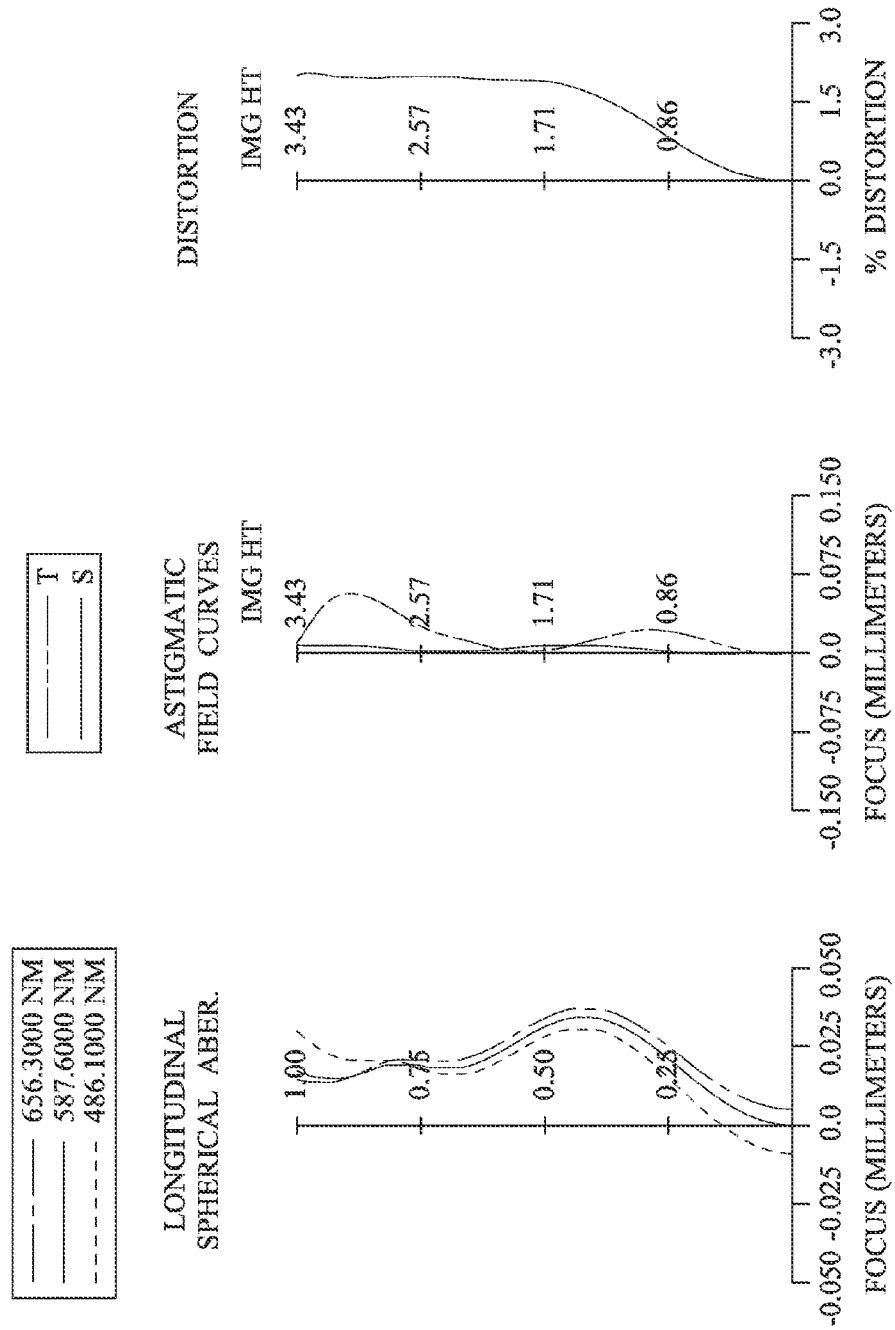
FIG. 4 shows, in order from left to right, spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment. In FIG. 3, the image capturing device includes a photographing optical lens assembly (its reference numeral is omitted) and an image sensor 280. The photographing optical lens assembly includes, in order from an object side to an image side, an aperture stop 200, a first lens element 210, a second lens element 220, a third lens element 230, a fourth lens element 240, a fifth lens element 250, an IR-cut filter 260 and an image surface 270, wherein the image sensor 280 is located at the image side of the photographing optical lens assembly.

The photographing optical lens assembly has a total of five lens elements (210-250) with refractive power, and there is an air gap in a paraxial region between any two of the first lens element 210, the second lens element 220, the third lens element 230, the fourth lens element 240, and the fifth lens element 250 that are adjacent to each other.

The first lens element 210 with positive refractive power has an object-side surface 211 being convex in a paraxial region thereof and an image-side surface 212 being planar in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. Moreover, an off-axial region of the object-side surface 231 of the third lens element 230 is closer to the object side than the paraxial region of the object-side surface 231 of the third lens element 230.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Moreover, the image-side surface 242 of the fourth lens element 240 has at least one convex shape in an off-axial region thereof.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Moreover, the image-side surface 252 of the fifth lens element 250 has at least one convex surface in an off-axial region thereof.

The IR-cut filter 260 is made of plastic material and located between the fifth lens element 250 and the image surface 270, and will not affect a focal length of the photographing optical lens assembly.

The detailed optical data of the 2nd embodiment are shown in Table 3 and the aspheric surface data are shown in Table 4 below.

TABLE 3

2nd Embodiment
f = 4.41 mm, Fno = 2.03, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.359 | | | | |
| 2 | Lens 1 | 1.741 | ASP | 0.931 | Plastic | 1.535 | 55.7 | 3.25 |
| 3 | | ∞ | ASP | 0.035 | | | | |
| 4 | Lens 2 | 14.461 | ASP | 0.220 | Plastic | 1.650 | 21.5 | −6.68 |
| 5 | | 3.319 | ASP | 0.393 | | | | |
| 6 | Lens 3 | 28.877 | ASP | 0.446 | Plastic | 1.639 | 23.5 | 22.66 |
| 7 | | −28.877 | ASP | 0.559 | | | | |
| 8 | Lens 4 | 46.263 | ASP | 0.598 | Plastic | 1.650 | 21.5 | −11.27 |
| 9 | | 6.294 | ASP | 0.133 | | | | |
| 10 | Lens 5 | 1.913 | ASP | 0.898 | Plastic | 1.535 | 55.7 | 146.64 |
| 11 | | 1.640 | ASP | 0.500 | | | | |
| 12 | IR-cut filter | Plano | | 0.100 | Plastic | 1.514 | 56.8 | — |
| 13 | | Plano | | 0.407 | | | | |
| 14 | Image | Plano | | — | | | | |

Note:
Reference wavelength is 587.6 nm (d-line).

TABLE 4

| Aspheric Coefficients | | | | | |
|---|---|---|---|---|---|
| | Surface # | | | | |
| | 2 | 3 | 4 | 5 | 6 |
| k = | −2.2929E−01 | 0.0000E+00 | −6.1654E+01 | −4.5928E+01 | −8.8907E+01 |
| A4 = | 3.3571E−03 | −1.1926E−01 | −1.5860E−01 | 9.3946E−02 | −9.3588E−02 |
| A6 = | −1.3329E−02 | 4.2928E−01 | 6.0178E−01 | −6.7916E−02 | 6.1687E−02 |
| A8 = | 4.7452E−02 | −8.4813E−01 | −1.1545E+00 | 2.4360E−01 | −1.6847E−01 |
| A10 = | −7.5349E−02 | 8.5122E−01 | 1.2166E+00 | −5.5480E−01 | 2.4038E−01 |
| A12 = | 5.0338E−02 | −4.5311E−01 | −6.9714E−01 | 6.8362E−01 | −1.8629E−01 |
| A14 = | −1.1022E−02 | 1.0114E−01 | 1.8350E−01 | −4.2281E−01 | 5.8603E−02 |
| A16 = | −2.2433E−03 | −1.6357E−03 | −1.0101E−02 | 1.0872E−01 | 8.9057E−04 |
| | Surface # | | | | |
| | 7 | 8 | 9 | 10 | 11 |
| k = | −1.0000E+00 | −6.8947E+01 | −4.7217E+01 | −2.8279E+00 | −1.0962E+00 |
| A4 = | −5.1773E−02 | 7.9094E−01 | −1.6489E−02 | −2.3356E−01 | −1.7623E−01 |
| A6 = | −8.5944E−02 | −5.8079E+00 | 7.5120E−04 | 1.0234E−01 | 6.8940E−02 |
| A8 = | 1.5119E−01 | 1.6997E+01 | −7.0374E−03 | −2.7659E−02 | −2.1942E−02 |
| A10 = | −1.7673E−01 | −4.3698E+01 | 3.6370E−03 | 5.1087E−03 | 4.6814E−03 |
| A12 = | 1.3317E−01 | 7.4770E+01 | −9.6177E−04 | −6.0683E−04 | −6.1008E−04 |
| A14 = | −5.9165E−02 | −7.7523E+01 | 1.4915E−04 | 4.0978E−05 | 4.3208E−05 |
| A16 = | 1.2606E−02 | 3.4470E+01 | −1.0078E−05 | −1.1864E−06 | −1.2599E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.41 | T23/CT3 | 0.88 |
| Fno | 2.03 | T34/T45 | 4.20 |
| HFOV [deg.] | 37.2 | R4/R1 | 1.91 |
| V3 | 23.5 | (R5 + R6)/(R5 − R6) | 0.00 |
| V4 | 21.5 | |R8|/R9 | 3.29 |
| V2 + V3 + V4 + V5 | 122.2 | (f/R5) − (f/R6) | 0.31 |
| CT5/CT4 | 1.50 | |f/f4| + |f/f5| | 0.42 |

3rd Embodiment

Figure 5:
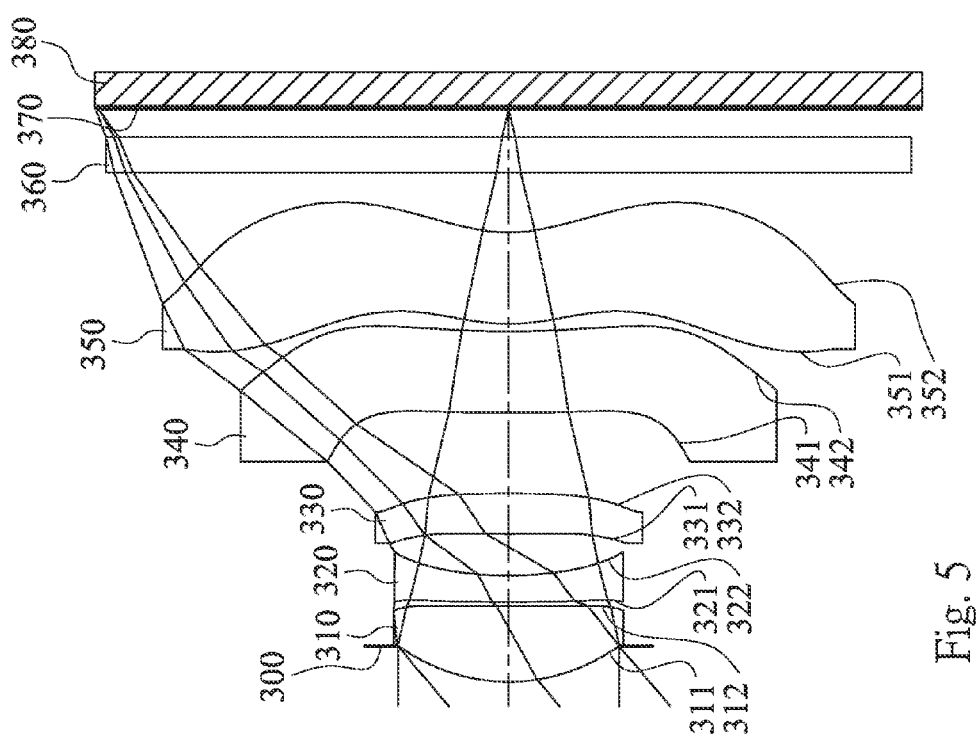
FIG. 5 is a schematic view of an image capturing device according to the 3rd embodiment of the present disclosure.
Figure 6:
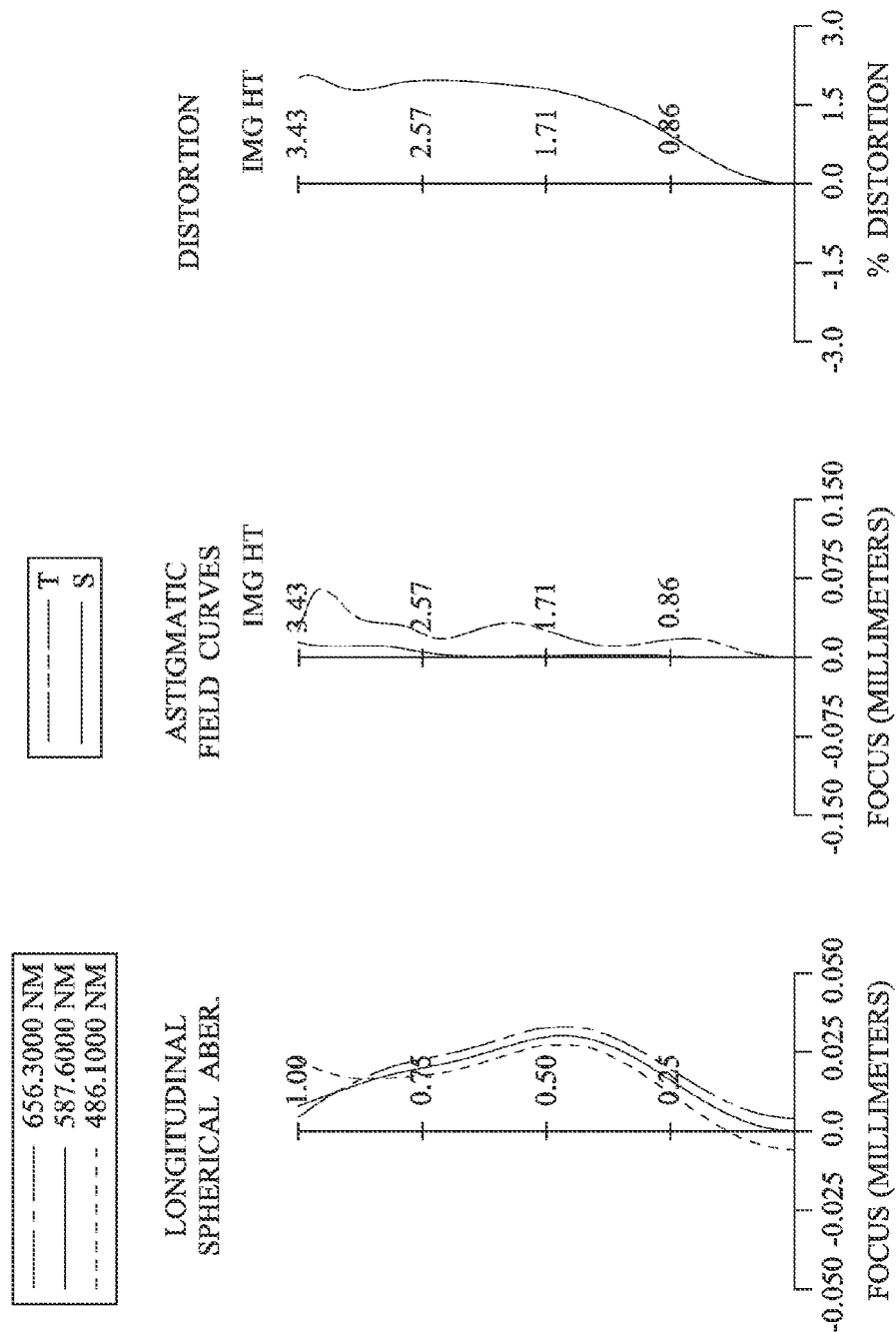
FIG. 6 shows, in order from left to right, spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment. In FIG. 5, the image capturing device includes a photographing optical lens assembly (its reference numeral is omitted) and an image sensor 380. The photographing optical lens assembly includes, in order from an object side to an image side, an aperture stop 300, a first lens element 310, a second lens element 320, a third lens element 330, a fourth lens element 340, a fifth lens element 350, an IR-cut filter 360 and an image surface 370, wherein the image sensor 380 is located at the image side of the photographing optical lens assembly. The photographing optical lens assembly has a total of five lens elements (310-350) with refractive power, and there is an air gap in a paraxial region between any two of the first lens element 310, the second lens element 320, the third lens element 330, the fourth lens element 340, and the fifth lens element 350 that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. Moreover, an off-axial region of the object-side surface 331 of the third lens element 330 is closer to the object side than the paraxial region of the object-side surface 331 of the third lens element 330.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Moreover, the image-side surface 342 of the fourth lens element 340 has at least one convex shape in an off-axial region thereof.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. Moreover, the image-side surface 352 of the fifth lens element 350 has at least one convex surface in an off-axial region thereof.

The IR-cut filter 360 is made of glass material and located between the fifth lens element 350 and the image surface 370, and will not affect a focal length of the photographing optical lens assembly.

The detailed optical data of the 3rd embodiment are shown in Table 5 and the aspheric surface data are shown in Table 6 below.

TABLE 5

3rd Embodiment
f = 3.94 mm, Fno = 2.13, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.298 | | | | |
| 2 | Lens 1 | 1.556 | ASP | 0.634 | Plastic | 1.530 | 55.8 | 3.08 |
| 3 | | 29.282 | ASP | 0.035 | | | | |
| 4 | Lens 2 | 13.172 | ASP | 0.220 | Plastic | 1.632 | 23.4 | −5.98 |
| 5 | | 2.920 | ASP | 0.350 | | | | |
| 6 | Lens 3 | 12.918 | ASP | 0.335 | Plastic | 1.544 | 55.9 | 15.65 |
| 7 | | −24.774 | ASP | 0.678 | | | | |
| 8 | Lens 4 | 46.263 | ASP | 0.680 | Plastic | 1.632 | 23.4 | −14.67 |
| 9 | | 7.680 | ASP | 0.063 | | | | |
| 10 | Lens 5 | 1.626 | ASP | 0.765 | Plastic | 1.544 | 55.9 | 1238.12 |
| 11 | | 1.360 | ASP | 0.500 | | | | |
| 12 | IR-cut filter | Plano | | 0.300 | Glass | 1.517 | 64.2 | — |

TABLE 5-continued

3rd Embodiment
f = 3.94 mm, Fno = 2.13, HFOV = 40.3 deg.

| Surface # | | Curvature Radius | Thickness | Material | Index | Abbe # | Focal Length |
|---|---|---|---|---|---|---|---|
| 13 | | Plano | 0.241 | | | | |
| 14 | Image | Plano | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | −9.4846E−02 | −9.0000E+01 | −9.0000E+01 | −3.4811E+01 | −4.0020E+01 |
| A4 = | 2.7862E−03 | −1.1851E−01 | −1.5803E−01 | 1.1299E−01 | −1.4590E−01 |
| A6 = | 9.6927E−04 | 4.6889E−01 | 6.3554E−01 | −4.9741E−02 | 8.7080E−02 |
| A8 = | 4.2508E−02 | −8.6302E−01 | −1.1630E+00 | 2.3297E−01 | −1.8366E−01 |
| A10 = | −9.7624E−02 | 8.0522E−01 | 1.1912E+00 | −5.5363E−01 | 2.3011E−01 |
| A12 = | 3.3297E−02 | −4.7369E−01 | −7.5007E−01 | 6.7976E−01 | −1.8752E−01 |
| A14 = | 9.1370E−02 | 5.9250E−02 | 1.3982E−01 | −4.1650E−01 | 5.8603E−02 |
| A16 = | −8.4032E−02 | 4.7943E−02 | 7.0116E−02 | 1.2116E−01 | 2.4045E−02 |

| | Surface # | | | | |
|---|---|---|---|---|---|
| | 7 | 8 | 9 | 10 | 11 |
| k = | −1.0000E+00 | −6.8947E+01 | −1.0000E+00 | −3.1045E+00 | −1.1290E+00 |
| A4 = | −9.9913E−02 | 9.3703E−02 | −1.7529E−02 | −2.4042E−01 | −2.2519E−01 |
| A6 = | −5.8122E−02 | −1.7987E−01 | −3.3935E−04 | 1.0357E−01 | 9.9472E−02 |
| A8 = | 1.5006E−01 | 1.5739E−01 | −7.3185E−03 | −2.7466E−02 | −3.3735E−02 |
| A10 = | −2.7005E−01 | −1.2764E−01 | 3.6326E−03 | 4.9401E−03 | 7.5530E−03 |
| A12 = | 3.0752E−01 | 7.1398E−02 | −9.5196E−04 | −5.6553E−04 | −1.0179E−03 |
| A14 = | −1.9958E−01 | −2.4103E−02 | 1.5067E−04 | 3.6521E−05 | 7.3430E−05 |
| A16 = | 6.3465E−02 | 3.4511E−03 | −1.0272E−05 | −1.0055E−06 | −2.1557E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.94 | T23/CT3 | 1.04 |
| Fno | 2.13 | T34/T45 | 10.76 |
| HFOV [deg.] | 40.3 | R4/R1 | 1.88 |
| V3 | 55.9 | (R5 + R6)/(R5 − R6) | −0.31 |
| V4 | 23.4 | |R8|/R9 | 4.72 |
| V2 + V3 + V4 + V5 | 158.6 | (f/R5) − (f/R6) | 0.46 |
| CT5/CT4 | 1.13 | |f/f4| + |f/f5| | 0.27 |

4th Embodiment

Figure 7:
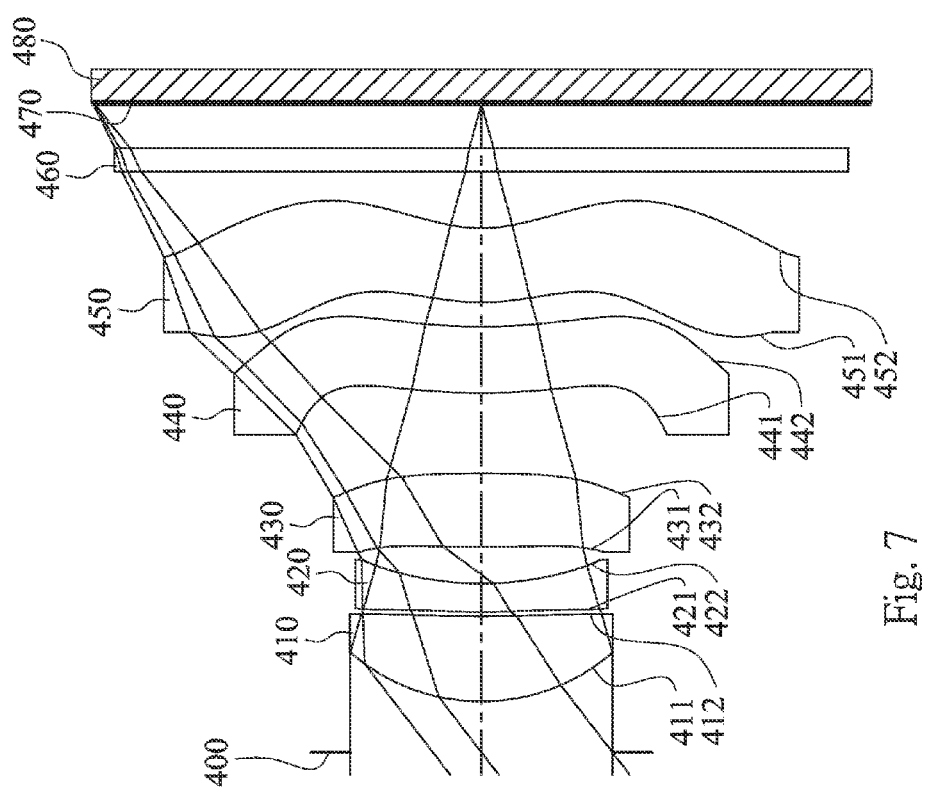
FIG. 7 is a schematic view of an image capturing device according to the 4th embodiment of the present disclosure.
Figure 8:
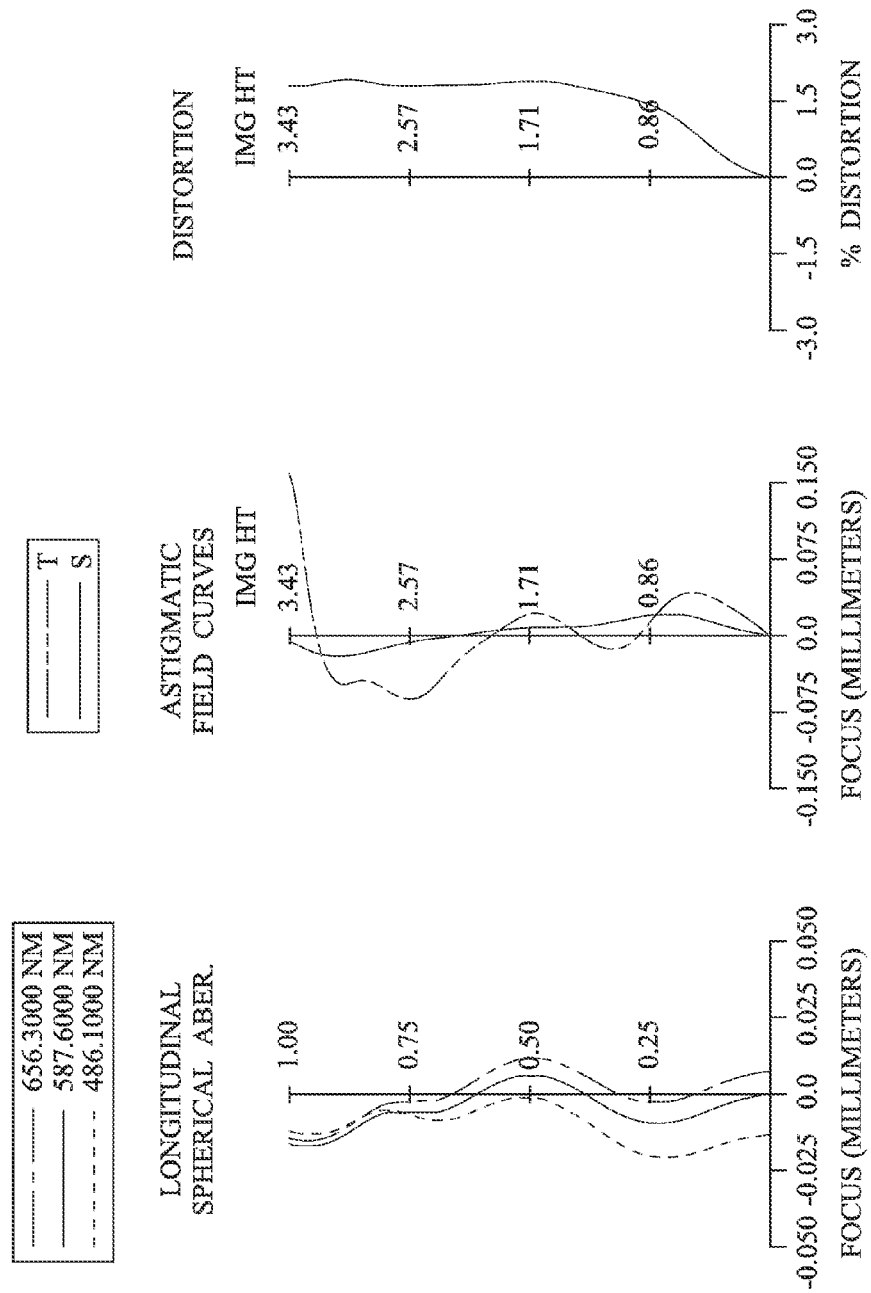
FIG. 8 shows, in order from left to right, spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment. In FIG. 7, the image capturing device includes a photographing optical lens assembly (its reference numeral is omitted) and an image sensor 480. The photographing optical lens assembly includes, in order from an object side to an image side, an aperture stop 400, a first lens element 410, a second lens element 420, a third lens element 430, a fourth lens element 440, a fifth lens element 450, an IR-cut filter 460 and an image surface 470, wherein the image sensor 480 is located at the image side of the photographing optical lens assembly. The photographing optical lens assembly has a total of five lens elements (410-450) with refractive power, and there is an air gap in a paraxial region between any two of the first lens element 410, the second lens element 420, the third lens element 430, the fourth lens element 440, and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. Moreover, an off-axial region of the object-side surface 431 of the third lens element 430 is closer to the object side than the paraxial region of the object-side surface 431 of the third lens element 430.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Moreover, the image-side surface 442 of the fourth lens element 440 has at least one convex shape in an off-axial region thereof.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. Moreover, the image-side surface 452 of the fifth lens element 450 has at least one convex surface in an off-axial region thereof.

The IR-cut filter 460 is made of glass material and located between the fifth lens element 450 and the image surface 470, and will not affect a focal length of the photographing optical lens assembly.

The detailed optical data of the 4th embodiment are shown in Table 7 and the aspheric surface data are shown in Table 8 below.

TABLE 7

4th Embodiment
f = 4.38 mm, Fno = 1.89, HFOV = 37.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | 0.450 |  |  |  |  |
| 2 | Lens 1 | 1.805 | ASP | 0.757 | Plastic | 1.544 | 55.9 | 3.79 |
| 3 |  | 12.247 | ASP | 0.035 |  |  |  |  |
| 4 | Lens 2 | 6.089 | ASP | 0.250 | Plastic | 1.639 | 23.5 | −6.41 |
| 5 |  | 2.409 | ASP | 0.324 |  |  |  |  |
| 6 | Lens 3 | 9.971 | ASP | 0.654 | Plastic | 1.544 | 55.9 | 10.55 |
| 7 |  | −13.217 | ASP | 0.712 |  |  |  |  |
| 8 | Lens 4 | 7.036 | ASP | 0.589 | Plastic | 1.639 | 23.5 | 147.13 |
| 9 |  | 7.357 | ASP | 0.212 |  |  |  |  |
| 10 | Lens 5 | 1.992 | ASP | 0.657 | Plastic | 1.535 | 55.7 | −12.73 |
| 11 |  | 1.364 | ASP | 0.500 |  |  |  |  |
| 12 | IR-cut filter | Plano |  | 0.210 | Glass | 1.517 | 64.2 | — |
| 13 |  | Plano |  | 0.400 |  |  |  |  |
| 14 | Image | Plano |  | — |  |  |  |  |

Note:
Reference wavelength is 587.6 nm (d-line).
Effective radius of Surface 5 is 1.060 mm.

TABLE 8

Aspheric Coefficients

| Surface # | 2 | 3 | 4 | 5 | 6 |
|---|---|---|---|---|---|
| k = | 2.2423E−01 | −8.9825E+01 | −6.3991E+01 | −2.3276E+01 | −9.0000E+01 |
| A4 = | 9.8460E−03 | −1.0013E−01 | −1.5689E−01 | 7.9003E−02 | −6.0201E−02 |
| A6 = | −4.0405E−02 | 3.8204E−01 | 4.6806E−01 | −4.0529E−02 | 4.3068E−02 |
| A8 = | 8.8242E−02 | −8.3229E−01 | −9.3962E−01 | −3.6205E−02 | −1.3705E−01 |
| A10 = | −1.0713E−01 | 9.2467E−01 | 1.0238E+00 | 1.3757E−01 | 2.1515E−01 |
| A12 = | 6.7307E−02 | −4.9423E−01 | −5.4706E−01 | −1.2992E−01 | −1.8237E−01 |
| A14 = | −1.7370E−02 | 1.0003E−01 | 1.1410E−01 | 4.7283E−02 | 5.8617E−02 |

| Surface # | 7 | 8 | 9 | 10 | 11 |
|---|---|---|---|---|---|
| k = | −4.3260E+01 | −6.8947E+01 | −3.0724E+01 | −3.4774E+00 | −1.3889E+00 |
| A4 = | −2.3126E−02 | 8.4239E−02 | 8.6829E−02 | −1.4455E−01 | −2.0297E−01 |
| A6 = | −1.4572E−01 | −1.0870E−01 | −1.1537E−01 | 7.1454E−03 | 8.3516E−02 |
| A8 = | 3.0353E−01 | 3.4158E−02 | 5.9411E−02 | 1.1681E−02 | −2.6840E−02 |
| A10 = | −3.7541E−01 | 3.8462E−03 | −1.7997E−02 | −3.3188E−03 | 5.8825E−03 |
| A12 = | 2.7257E−01 | −6.6828E−03 | 2.8487E−03 | 4.0245E−04 | −7.7956E−04 |
| A14 = | −1.0784E−01 | 1.1956E−03 | −1.7735E−04 | −2.3553E−05 | 5.5493E−05 |
| A16 = | 1.8249E−02 |  |  | 5.4021E−07 | −1.6147E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.38 | T23/CT3 | 0.50 |
| Fno | 1.89 | T34/T45 | 3.36 |
| HFOV [deg.] | 37.6 | R4/R1 | 1.33 |
| V3 | 55.9 | (R5 + R6)/(R5 − R6) | −0.14 |
| V4 | 23.5 | |R8|/R9 | 3.69 |
| V2 + V3 + V4 + V5 | 158.6 | (f/R5) − (f/R6) | 0.77 |
| CT5/CT4 | 1.12 | |f/f4| + |f/f5| | 0.37 |

5th Embodiment

Figure 9:
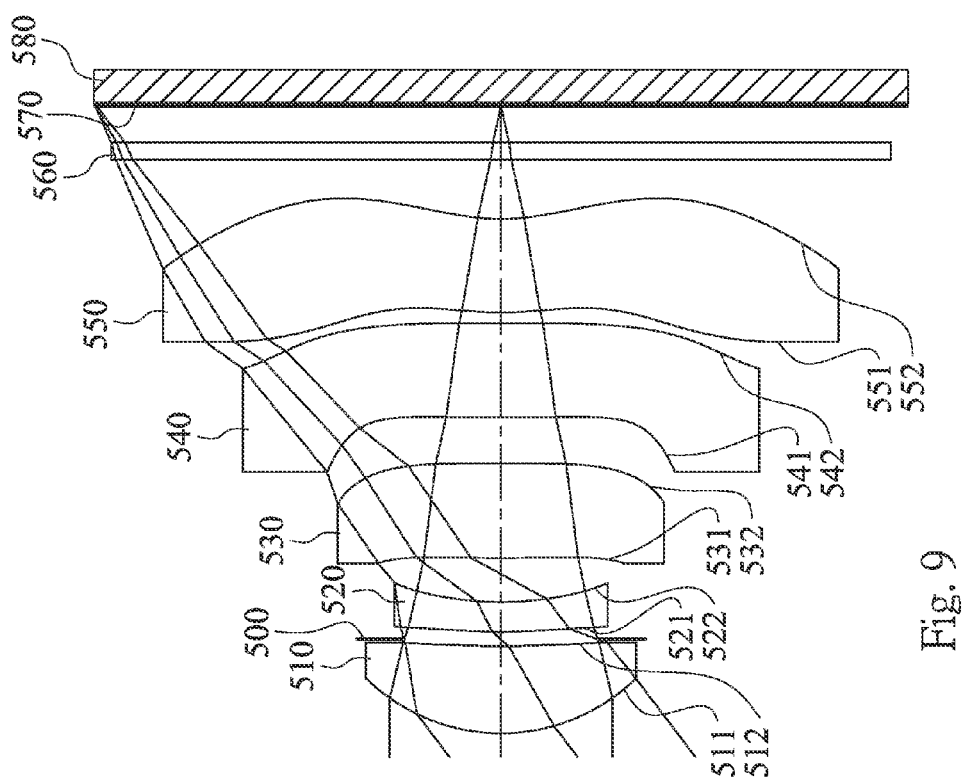
FIG. 9 is a schematic view of an image capturing device according to the 5th embodiment of the present disclosure.
Figure 10:
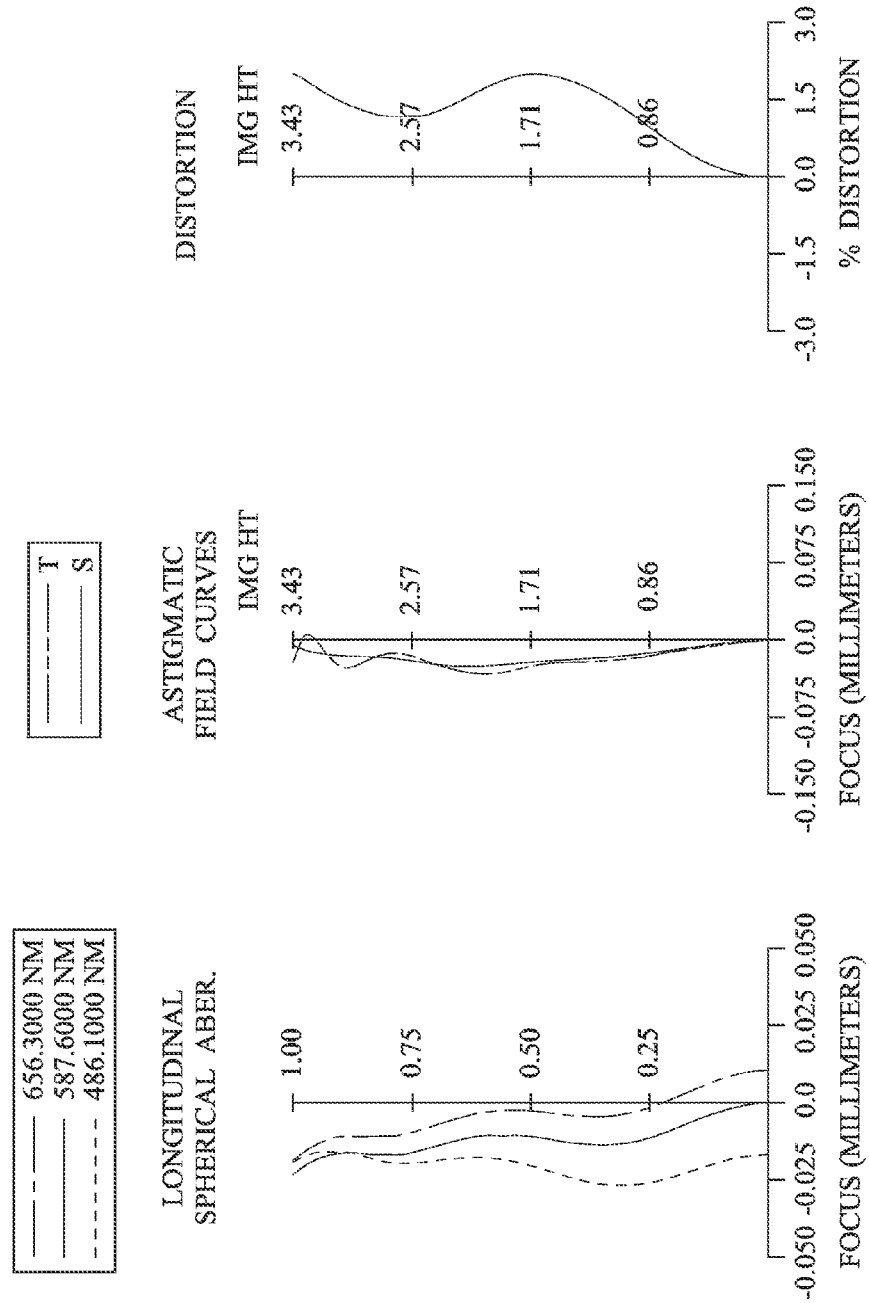
FIG. 10 shows, in order from left to right, spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment. In FIG. 9, the image capturing device includes a photographing optical lens assembly (its reference numeral is omitted) and an image sensor 580. The photographing optical lens assembly includes, in order from an object side to an image side, a first lens element 510, an aperture stop 500, a second lens element 520, a third lens element 530, a fourth lens element 540, a fifth lens element 550, an IR-cut filter 560 and an image surface 570, wherein the image sensor 580 is located at the image side of the photographing optical lens assembly. The photographing optical lens assembly has a total of five lens elements (510-550) with refractive power, and there is an air gap in a paraxial region between any two of the first lens element 510, the second lens element 520, the third lens element 530, the fourth lens element 540, and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. Moreover, an off-axial region of the object-side surface 531 of the third lens element 530 is closer to the object side than the paraxial region of the object-side surface 531 of the third lens element 530.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Moreover, the image-side surface 542 of the fourth lens element 540 has at least one convex shape in an off-axial region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. Moreover, the image-side surface 552 of the fifth lens element 550 has at least one convex surface in an off-axial region thereof.

The IR-cut filter 560 is made of glass material and located between the fifth lens element 550 and the image surface 570, and will not affect a focal length of the photographing optical lens assembly.

The detailed optical data of the 5th embodiment are shown in Table 9 and the aspheric surface data are shown in Table 10 below.

TABLE 9

5th Embodiment
f = 4.44 mm, Fno = 2.37, HFOV = 37.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.636 ASP | 0.736 | Plastic | 1.544 | 55.9 | 3.69 |
| 2 | | 7.430 ASP | 0.057 | | | | |
| 3 | Ape. Stop | Plano | 0.064 | | | | |
| 4 | Lens 2 | 4.535 ASP | 0.250 | Plastic | 1.650 | 21.4 | −9.14 |
| 5 | | 2.515 ASP | 0.372 | | | | |
| 6 | Lens 3 | 14.889 ASP | 0.798 | Plastic | 1.544 | 55.9 | 24.62 |
| 7 | | −131.347 ASP | 0.388 | | | | |
| 8 | Lens 4 | 61.904 ASP | 0.795 | Plastic | 1.650 | 21.4 | −148.46 |
| 9 | | 37.514 ASP | 0.091 | | | | |
| 10 | Lens 5 | 2.859 ASP | 0.788 | Plastic | 1.633 | 23.4 | −11.89 |
| 11 | | 1.851 ASP | 0.500 | | | | |
| 12 | IR-cut filter | Plano | 0.145 | Glass | 1.517 | 64.2 | — |

TABLE 9-continued

5th Embodiment
f = 4.44 mm, Fno = 2.37, HFOV = 37.2 deg.

| Surface # | | Curvature Radius | Thickness | Material | Index | Abbe # | Focal Length |
|---|---|---|---|---|---|---|---|
| 13 | | Plano | 0.318 | | | | |
| 14 | Image | Plano | — | | | | |

Note:
Reference wavelength is 587.6 nm (d-line).

TABLE 10

Aspheric Coefficients

| | | | Surface # | | |
|---|---|---|---|---|---|
| | 1 | 2 | 4 | 5 | 6 |
| k = | 1.3922E−02 | −9.0000E+01 | −6.2700E+01 | −2.5491E+01 | −1.0000E+00 |
| A4 = | 6.1365E−03 | −6.0382E−02 | −9.2679E−02 | 8.9094E−02 | −5.2575E−02 |
| A6 = | −2.9344E−02 | 1.1472E−01 | 1.2098E−01 | −1.3154E−01 | −2.1127E−02 |
| A8 = | 8.6246E−02 | −1.6140E−01 | −2.3306E−02 | 3.8442E−01 | 1.1428E−01 |
| A10 = | −1.2254E−01 | 1.9222E−01 | −3.5624E−02 | −4.7473E−01 | −2.5091E−01 |
| A12 = | 8.6418E−02 | −1.6226E−01 | −2.8225E−02 | 2.7227E−01 | 2.4059E−01 |
| A14 = | −2.4742E−02 | 5.8293E−02 | 4.6216E−02 | −4.0433E−02 | −9.6054E−02 |

| | | | Surface # | | |
|---|---|---|---|---|---|
| | 7 | 8 | 9 | 10 | 11 |
| k = | −9.0000E+01 | −6.8947E+01 | −1.8066E+01 | −1.7620E+00 | −1.0532E+00 |
| A4 = | −4.3710E−02 | 2.9880E−02 | −7.3865E−02 | −2.4024E−01 | −1.6791E−01 |
| A6 = | −1.9523E−02 | −9.1345E−02 | 6.1746E−02 | 9.6558E−02 | 6.5983E−02 |
| A8 = | −7.6674E−03 | 8.0991E−02 | −3.2674E−02 | −1.8147E−02 | −2.0324E−02 |
| A10 = | 2.6962E−02 | −7.7617E−02 | 8.4208E−03 | 1.4367E−03 | 4.1506E−03 |
| A12 = | −3.2873E−02 | 4.6136E−02 | −1.0178E−03 | 3.3382E−05 | −5.1217E−04 |
| A14 = | 1.7442E−02 | −1.8109E−02 | 4.6948E−05 | −1.2798E−05 | 3.4427E−05 |
| A16 = | −3.6771E−03 | 3.1021E−03 | | 5.8295E−07 | −9.6793E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.44 | T23/CT3 | 0.47 |
| Fno | 2.37 | T34/T45 | 4.26 |
| HFOV [deg.] | 37.2 | R4/R1 | 1.54 |
| V3 | 55.9 | (R5 + R6)/(R5 − R6) | −0.80 |
| V4 | 21.4 | |R8|/R9 | 13.12 |
| V2 + V3 + V4 + V5 | 122.1 | (f/R5) − (f/R6) | 0.33 |
| CT5/CT4 | 0.99 | |f/f4| + |f/f5| | 0.40 |

6th Embodiment

Figure 11:
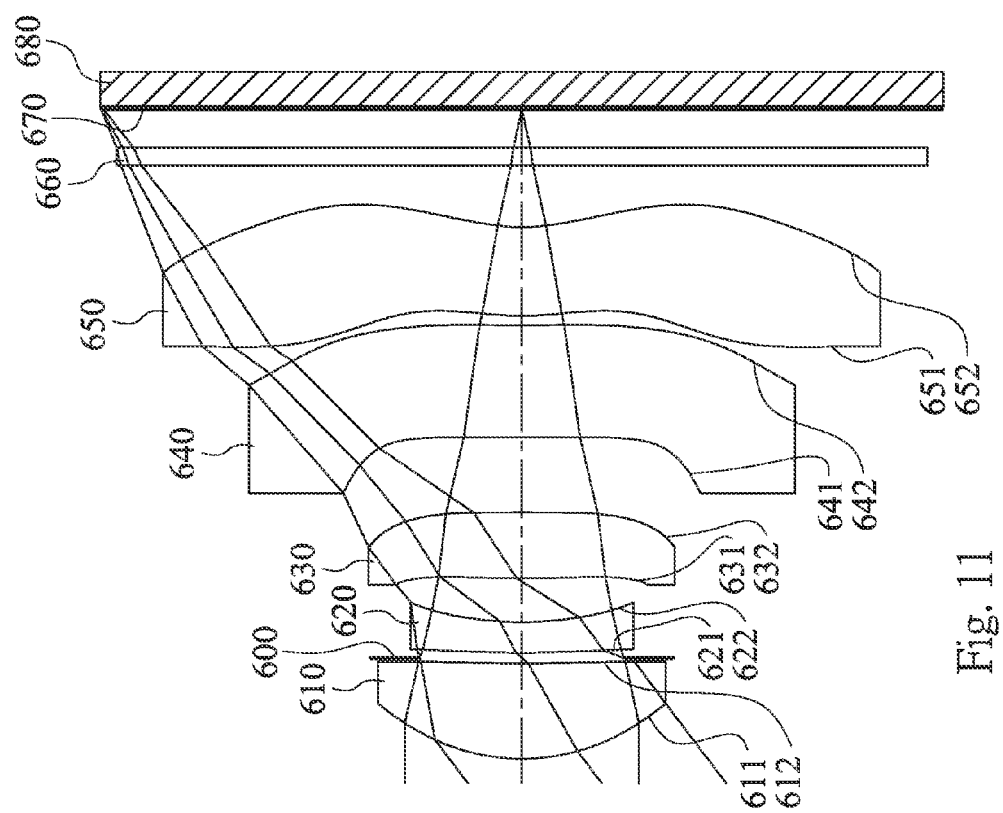
FIG. 11 is a schematic view of an image capturing device according to the 6th embodiment of the present disclosure.
Figure 12:
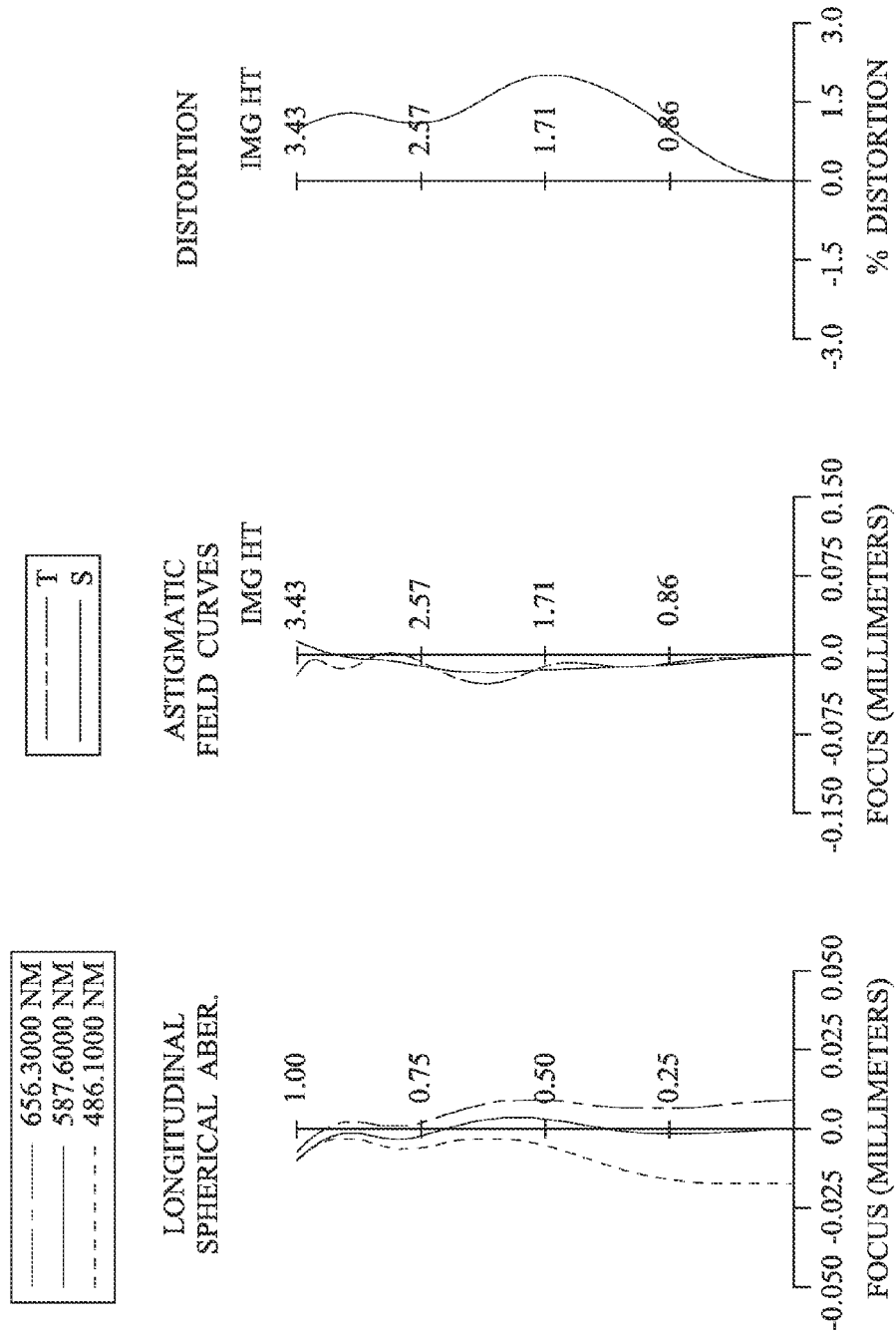
FIG. 12 shows, in order from left to right, spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment. In FIG. 11, the image capturing device includes a photographing optical lens assembly (its reference numeral is omitted) and an image sensor 680. The photographing optical lens assembly includes, in order from an object side to an image side, a first lens element 610, an aperture stop 600, a second lens element 620, a third lens element 630, a fourth lens element 640, a fifth lens element 650, an IR-cut filter 660 and an image surface 670, wherein the image sensor 680 is located at the image side of the photographing optical lens assembly. The photographing optical lens assembly has a total of five lens elements (610-650) with refractive power, and there is an air gap in a paraxial region between any two of the first lens element 610, the second lens element 620, the third lens element 630, the fourth lens element 640, and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. Moreover, an off-axial region of the object-side surface 631 of the third lens element 630 is closer to the object side than the paraxial region of the object-side surface 631 of the third lens element 630.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Moreover, the image-side surface 642 of the fourth lens element 640 has at least one convex shape in an off-axial region thereof.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. Moreover, the image-side surface 652 of the fifth lens element 650 has at least one convex surface in an off-axial region thereof.

The IR-cut filter 660 is made of glass material and located between the fifth lens element 650 and the image surface 670, and will not affect a focal length of the photographing optical lens assembly.

The detailed optical data of the 6th embodiment are shown in Table 11 and the aspheric surface data are shown in Table 12 below.

TABLE 11

6th Embodiment
f = 4.48 mm, Fno = 2.35, HFOV = 37.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.695 | ASP | 0.776 | Plastic | 1.544 | 55.9 | 3.77 |
| 2 | | 8.142 | ASP | 0.045 | | | | |
| 3 | Ape. Stop | Plano | | 0.042 | | | | |
| 4 | Lens 2 | 5.271 | ASP | 0.250 | Plastic | 1.639 | 23.5 | −8.12 |
| 5 | | 2.567 | ASP | 0.357 | | | | |
| 6 | Lens 3 | 8.689 | ASP | 0.538 | Plastic | 1.544 | 55.9 | 13.22 |
| 7 | | −40.960 | ASP | 0.609 | | | | |
| 8 | Lens 4 | 94.203 | ASP | 0.914 | Plastic | 1.639 | 23.5 | −19.55 |
| 9 | | 10.988 | ASP | 0.076 | | | | |
| 10 | Lens 5 | 2.359 | ASP | 0.724 | Plastic | 1.583 | 30.2 | −18.53 |
| 11 | | 1.718 | ASP | 0.500 | | | | |
| 12 | IR-cut filter | Plano | | 0.145 | Glass | 1.517 | 64.2 | — |
| 13 | | Plano | | 0.324 | | | | |
| 14 | Image | Plano | | — | | | | |

Note:
Reference wavelength is 587.6 nm.

TABLE 12

Aspheric Coefficients

| | Surface # | | | | |
|---|---|---|---|---|---|
| | 1 | 2 | 4 | 5 | 6 |
| k = | −8.4239E−02 | −9.0000E+01 | −6.2700E+01 | −1.2250E+01 | −1.0000E+00 |
| A4 = | 4.4119E−03 | −1.3468E−01 | −2.0649E−01 | −5.2957E−02 | −7.7682E−02 |
| A6 = | −2.2134E−02 | 2.6817E−01 | 4.4443E−01 | 2.4162E−01 | −1.6428E−02 |
| A8 = | 6.4054E−02 | −3.4236E−01 | −5.2307E−01 | −2.2432E−01 | 1.1800E−01 |
| A10 = | −9.2433E−02 | 3.0434E−01 | 4.8927E−01 | 1.6029E−01 | −2.8951E−01 |
| A12 = | 6.3941E−02 | −1.9021E−01 | −3.8354E−01 | −1.1533E−01 | 2.8995E−01 |
| A14 = | −1.8531E−02 | 5.5969E−02 | 1.6029E−01 | 5.9404E−02 | −1.2062E−01 |

| | Surface # | | | | |
|---|---|---|---|---|---|
| | 7 | 8 | 9 | 10 | 11 |
| k = | 0.0000E+00 | −6.8947E+01 | −1.8056E+01 | −2.0379E+00 | −1.0375E+00 |
| A4 = | −5.8847E−02 | 1.4269E−02 | −1.2976E−01 | −3.0757E−01 | −1.8962E−01 |
| A6 = | −3.2213E−02 | −8.7209E−02 | 9.4054E−02 | 1.3831E−01 | 7.8151E−02 |
| A8 = | 2.8062E−02 | 8.9279E−02 | −4.1256E−02 | −3.0774E−02 | −2.4390E−02 |
| A10 = | −2.4243E−02 | −8.4269E−02 | 9.4862E−03 | 3.7689E−03 | 4.9549E−03 |
| A12 = | −3.8925E−03 | 4.8303E−02 | −1.0772E−03 | −2.4164E−04 | −5.9651E−04 |
| A14 = | 1.3387E−02 | −1.9065E−02 | 4.8186E−05 | 6.2844E−06 | 3.8427E−05 |
| A16 = | −5.5571E−03 | 3.4001E−03 | | 4.7562E−10 | −1.0211E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.48 | T23/CT3 | 0.66 |
| Fno | 2.35 | T34/T45 | 8.01 |
| HFOV [deg.] | 37.2 | R4/R1 | 1.51 |
| V3 | 55.9 | (R5 + R6)/(R5 − R6) | −0.65 |
| V4 | 23.5 | |R8|/R9 | 4.66 |
| V2 + V3 + V4 + V5 | 133.1 | (f/R5) − (f/R6) | 0.62 |
| CT5/CT4 | 0.79 | |f/f4| + |f/f5| | 0.47 |

7th Embodiment

Figure 13:
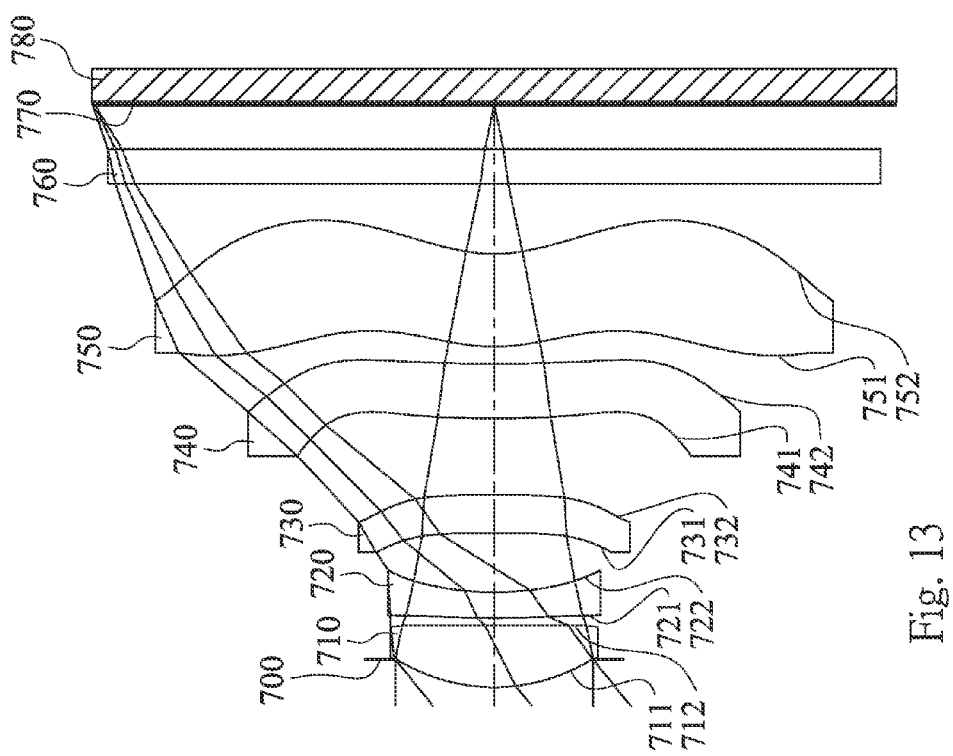
FIG. 13 is a schematic view of an image capturing device according to the 7th embodiment of the present disclosure
Figure 14:
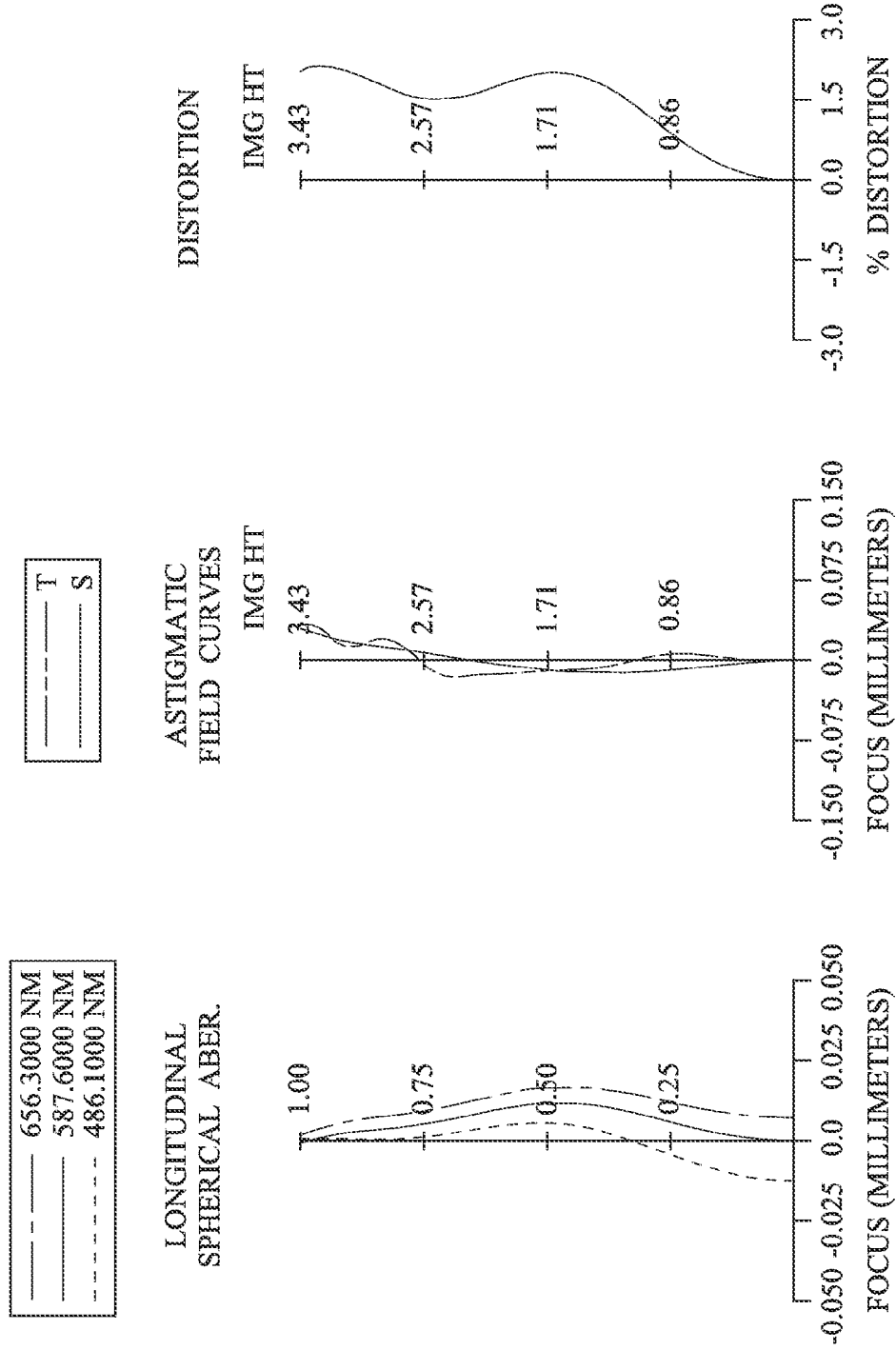
FIG. 14 shows, in order from left to right, spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment. In FIG. 13, the image capturing device includes a photographing optical lens assembly (its reference numeral is omitted) and an image sensor 780. The photographing optical lens assembly includes, in order from an object side to an image side, an aperture stop 700, a first lens element 710, a second lens element 720, a third lens element 730, a fourth lens element 740, a fifth lens element 750, an IR-cut filter 760 and an image surface 770, wherein the image sensor 780 is located at the image side of the photographing optical lens assembly. The photographing optical lens assembly has a total of five lens elements (710-750) with refractive power, and there is an air gap in a paraxial region between any two of the first lens element 710, the second lens element 720, the third lens element 730, the fourth lens element 740, and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. Moreover, an off-axial region of the object-side surface 731 of the third lens element 730 is closer to the object side than the paraxial region of the object-side surface 731 of the third lens element 730.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. Moreover, the image-side surface 742 of the fourth lens element 740 has at least one convex shape in an off-axial region thereof.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Moreover, the image-side surface 752 of the fifth lens element 750 has at least one convex surface in an off-axial region thereof.

The IR-cut filter 760 is made of glass material and located between the fifth lens element 750 and the image surface 770, and will not affect a focal length of the photographing optical lens assembly.

The detailed optical data of the 7th embodiment are shown in Table 13 and the aspheric surface data are shown in Table 14 below.

TABLE 13

7th Embodiment
f = 4.15 mm, Fno = 2.45, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.237 | | | | |
| 2 | Lens 1 | 1.595 | ASP | 0.527 | Plastic | 1.544 | 55.9 | 3.25 |
| 3 | | 14.405 | ASP | 0.066 | | | | |
| 4 | Lens 2 | 5.737 | ASP | 0.220 | Plastic | 1.639 | 23.5 | −6.23 |
| 5 | | 2.314 | ASP | 0.505 | | | | |
| 6 | Lens 3 | 76.778 | ASP | 0.328 | Plastic | 1.544 | 55.9 | 71.64 |
| 7 | | −79.062 | ASP | 0.658 | | | | |
| 8 | Lens 4 | 21.042 | ASP | 0.470 | Plastic | 1.639 | 23.5 | 76.13 |
| 9 | | 36.759 | ASP | 0.144 | | | | |
| 10 | Lens 5 | 1.649 | ASP | 0.794 | Plastic | 1.535 | 55.7 | 132.44 |
| 11 | | 1.405 | ASP | 0.600 | | | | |
| 12 | IR-cut filter | Plano | | 0.300 | Glass | 1.517 | 64.2 | — |

TABLE 13-continued

7th Embodiment
f = 4.15 mm, Fno = 2.45, HFOV = 39.0 deg.

| Surface # | | Curvature Radius | Thickness | Material | Index | Abbe # | Focal Length |
|---|---|---|---|---|---|---|---|
| 13 | | Plano | 0.388 | | | | |
| 14 | Image | Plano | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | 5.4126E−02 | −9.0000E+01 | −9.0000E+01 | −2.5356E+01 | −1.0000E+00 |
| A4 = | 2.3093E−03 | −1.6112E−01 | −2.2506E−01 | 9.7095E−02 | −1.9322E−01 |
| A6 = | 3.7269E−03 | 4.6527E−01 | 6.9010E−01 | −4.1051E−02 | 9.2496E−02 |
| A8 = | 3.9788E−03 | −8.2507E−01 | −1.1582E+00 | 2.7284E−01 | −2.1864E−01 |
| A10 = | −2.0513E−02 | 8.7567E−01 | 1.2241E+00 | −5.9997E−01 | 2.9225E−01 |
| A12 = | −2.3501E−02 | −5.4780E−01 | −7.7607E−01 | 6.9831E−01 | −2.1949E−01 |
| A14 = | 9.1370E−02 | 5.9250E−02 | 1.3982E−01 | −4.1650E−01 | 5.8603E−02 |
| A16 = | −8.4032E−02 | 4.7943E−02 | 7.0116E−02 | 1.2116E−01 | 2.4045E−02 |

| | Surface # | | | | |
|---|---|---|---|---|---|
| | 7 | 8 | 9 | 10 | 11 |
| k = | −1.0000E+00 | −6.8947E+01 | −5.9649E+00 | −1.5938E+00 | −1.9108E+00 |
| A4 = | −1.8261E−01 | 1.2434E−01 | 3.5221E−02 | −2.1249E−01 | −1.4387E−01 |
| A6 = | 1.6354E−02 | −1.5340E−01 | −1.7775E−02 | 7.2194E−02 | 5.7747E−02 |
| A8 = | −7.4203E−02 | 8.6629E−02 | −6.7611E−03 | −1.4631E−02 | −1.8116E−02 |
| A10 = | 1.7368E−01 | −3.5272E−02 | 3.9930E−03 | 2.0478E−03 | 3.7819E−03 |
| A12 = | −1.9992E−01 | 5.9766E−03 | −9.2669E−04 | −1.9376E−04 | −4.7864E−04 |
| A14 = | 1.1373E−01 | 3.5965E−04 | 1.4725E−04 | 1.1007E−05 | 3.2712E−05 |
| A16 = | −1.6069E−02 | −1.5767E−04 | −1.1833E−05 | −2.7897E−07 | −9.1573E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.15 | T23/CT3 | 1.54 |
| Fno | 2.45 | T34/T45 | 4.57 |
| HFOV [deg.] | 39.0 | R4/R1 | 1.45 |
| V3 | 55.9 | (R5 + R6)/(R5 − R6) | −0.01 |
| V4 | 23.5 | |R8|/R9 | 22.29 |
| V2 + V3 + V4 + V5 | 158.6 | (f/R5) − (f/R6) | 0.11 |
| CT5/CT4 | 1.69 | |f/f4| + |f/f5| | 0.09 |

8th Embodiment

Figure 15:
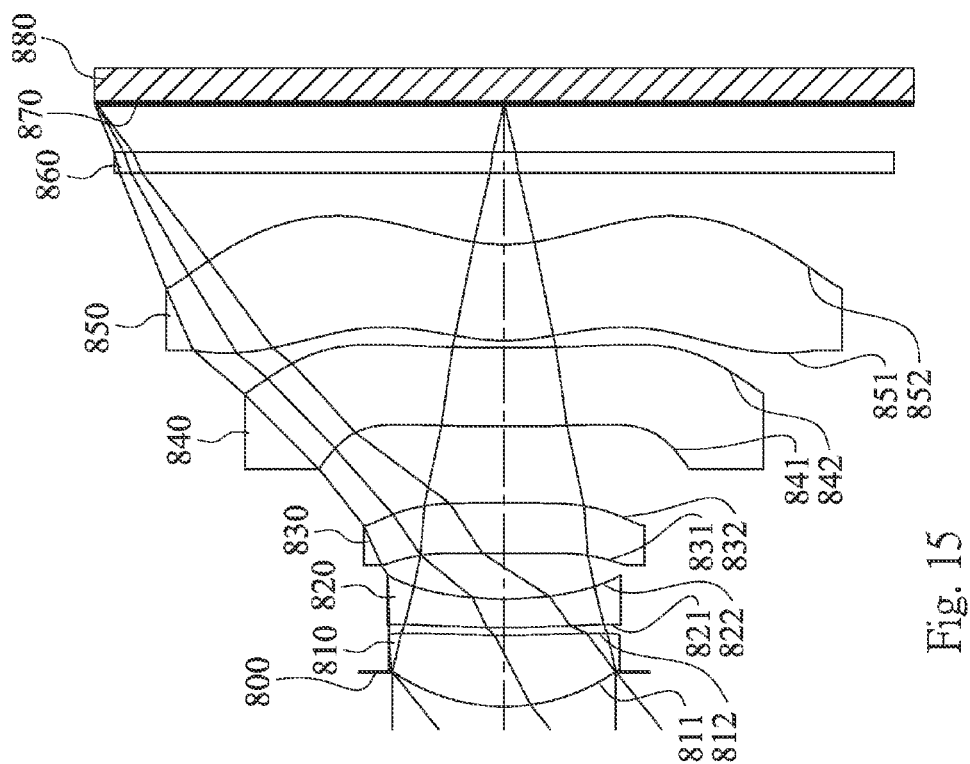
FIG. 15 is a schematic view of an image capturing device according to the 8th embodiment of the present disclosure.
Figure 16:
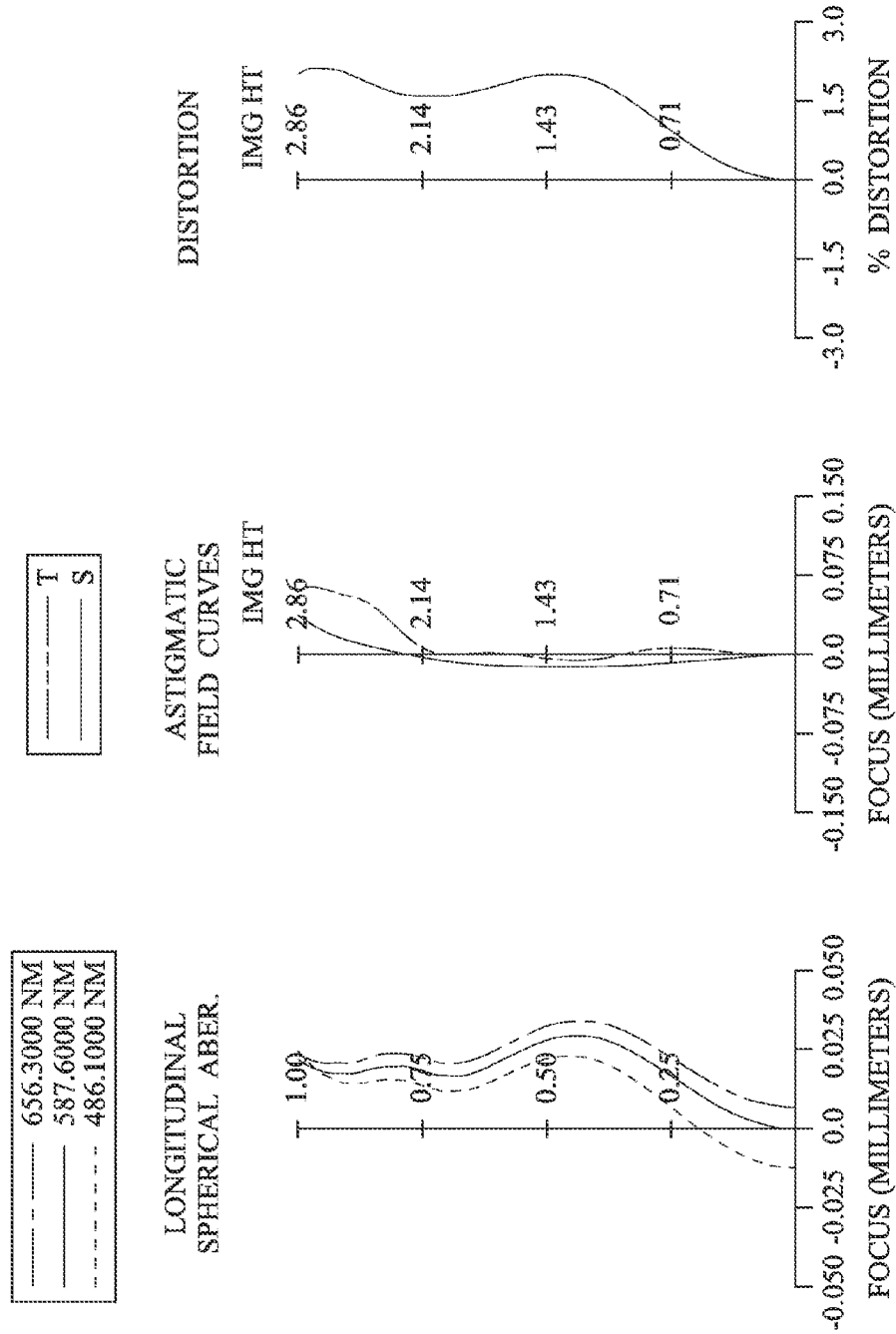
FIG. 16 shows, in order from left to right, spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment. In FIG. 15, the image capturing device includes a photographing optical lens assembly (its reference numeral is omitted) and an image sensor 880. The photographing optical lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870, wherein the image sensor 880 is located at the image side of the photographing optical lens assembly. The photographing optical lens assembly has a total of five lens elements (810-850) with refractive power, and there is an air gap in a paraxial region between any two of the first lens element 810, the second lens element 820, the third lens element 830, the fourth lens element 840, and the fifth lens element 850 that are adjacent to each other.

The first lens element 810 with positive refractive power has an object-side surface 811 being convex in a paraxial region thereof and an image-side surface 812 being concave in a paraxial region thereof. The first lens element 810 is made of glass material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. Moreover, an off-axial region of the object-side surface 831 of the third lens element 830 is closer to the object side than the paraxial region of the object-side surface 831 of the third lens element 830.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Moreover, the image-side surface 842 of the fourth lens element 840 has at least one convex shape in an off-axial region thereof.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. Moreover, the image-side surface 852 of the fifth lens element 850 has at least one convex surface in an off-axial region thereof.

The IR-cut filter 860 is made of glass material and located between the fifth lens element 850 and the image surface 870, and will not affect a focal length of the photographing optical lens assembly.

The detailed optical data of the 8th embodiment are shown in Table 15 and the aspheric surface data are shown in Table 16 below.

TABLE 15

8th Embodiment
f = 3.47 mm, Fno = 2.22, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.242 | | | | |
| 2 | Lens 1 | 1.366 | ASP | 0.501 | Glass | 1.542 | 62.9 | 3.09 |
| 3 | | 6.414 | ASP | 0.052 | | | | |
| 4 | Lens 2 | 4.302 | ASP | 0.200 | Plastic | 1.614 | 25.6 | −7.12 |
| 5 | | 2.131 | ASP | 0.322 | | | | |
| 6 | Lens 3 | 13.300 | ASP | 0.354 | Plastic | 1.535 | 55.7 | 18.69 |
| 7 | | −39.899 | ASP | 0.535 | | | | |
| 8 | Lens 4 | 89.180 | ASP | 0.552 | Plastic | 1.634 | 23.8 | −38.23 |
| 9 | | 19.014 | ASP | 0.050 | | | | |
| 10 | Lens 5 | 1.525 | ASP | 0.673 | Plastic | 1.544 | 55.9 | 305.38 |
| 11 | | 1.300 | ASP | 0.500 | | | | |
| 12 | IR-cut filter | Plano | | 0.145 | Glass | 1.517 | 64.2 | — |
| 13 | | Plano | | 0.343 | | | | |
| 14 | Image | Plano | | — | | | | |

Note:
Reference wavelength is 587.6 nm (d-line).

TABLE 16

Aspheric Coefficients

| Surface # | | | | | |
|---|---|---|---|---|---|
| | 2 | 3 | 4 | 5 | 6 |
| k = | 1.6323E−01 | −7.1612E+01 | −9.0000E+01 | −3.2346E+01 | −5.4791E+01 |
| A4 = | −1.0876E−02 | −3.0852E−01 | −4.1290E−01 | 1.2667E−01 | −2.5860E−01 |
| A6 = | −1.6451E−02 | 1.2458E+00 | 1.8110E+00 | −8.5570E−02 | 1.8464E−01 |
| A8 = | 2.6854E−01 | −2.8584E+00 | −4.2300E+00 | 1.0694E+00 | −6.6655E−01 |
| A10 = | −7.0693E−01 | 4.2094E+00 | 6.5275E+00 | −3.2633E+00 | 1.4453E+00 |
| A12 = | 1.9286E−01 | −3.7157E+00 | −6.0310E+00 | 5.1541E+00 | −1.6716E+00 |
| A14 = | 1.3079E+00 | 5.6938E−01 | 1.3732E+00 | −4.4698E+00 | 6.2891E−01 |
| A16 = | −1.2992E+00 | 7.4126E−01 | 1.0841E+00 | 1.8733E+00 | 3.7176E−01 |

| Surface # | | | | | |
|---|---|---|---|---|---|
| | 7 | 8 | 9 | 10 | 11 |
| k = | −1.0000E+00 | −6.8947E+01 | −1.0000E+00 | −1.5470E+00 | −1.6330E+00 |
| A4 = | −1.6939E−01 | 1.7648E−01 | 2.9994E−02 | −3.6316E−01 | −2.6163E−01 |
| A6 = | −1.8406E−01 | −3.8679E−01 | −2.9738E−02 | 1.7962E−01 | 1.4493E−01 |
| A8 = | 5.7553E−01 | 3.6957E−01 | −2.0176E−02 | −5.2579E−02 | −6.4763E−02 |
| A10 = | −1.2718E+00 | −3.0920E−01 | 1.9483E−02 | 1.0588E−02 | 1.9552E−02 |
| A12 = | 1.7996E+00 | 1.7369E−01 | −7.4110E−03 | −1.4414E−03 | −3.5678E−03 |
| A14 = | −1.4274E+00 | −6.6809E−02 | 1.5717E−03 | 1.1839E−04 | 3.5091E−04 |
| A16 = | 5.3128E−01 | 1.3231E−02 | −1.4440E−04 | −4.3690E−06 | −1.4142E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.47 | T23/CT3 | 0.91 |
| Fno | 2.22 | T34/T45 | 10.70 |
| HFOV [deg.] | 38.8 | R4/R1 | 1.56 |
| V3 | 55.7 | (R5 + R6)/(R5 − R6) | −0.50 |
| V4 | 23.8 | |R8|/R9 | 12.47 |
| V2 + V3 + V4 + V5 | 161.0 | (f/R5) − (f/R6) | 0.35 |
| CT5/CT4 | 1.22 | |f/f4| + |f/f5| | 0.10 |

9th Embodiment

Figure 17:
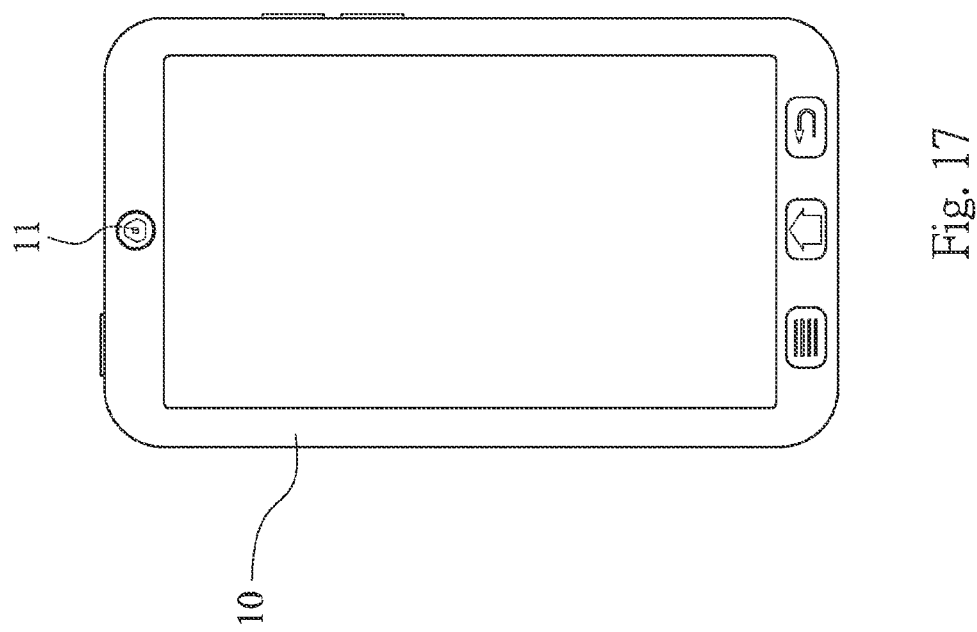
FIG. 17 is a schematic view of an electronic device according to the 9th embodiment of the present disclosure.

FIG. 17 is a schematic view of an electronic device 10 according to the 9th embodiment of the present disclosure. The electronic device 10 of the 9th embodiment is a smart phone, wherein the electronic device 10 includes an image capturing device 11. The image capturing device 11 includes a photographing optical lens assembly (not otherwise herein labeled) according to the present disclosure and an image sensor (not otherwise herein labeled), wherein the image sensor is located at an image side of the photographing optical lens assembly.

10th Embodiment

Figure 18:
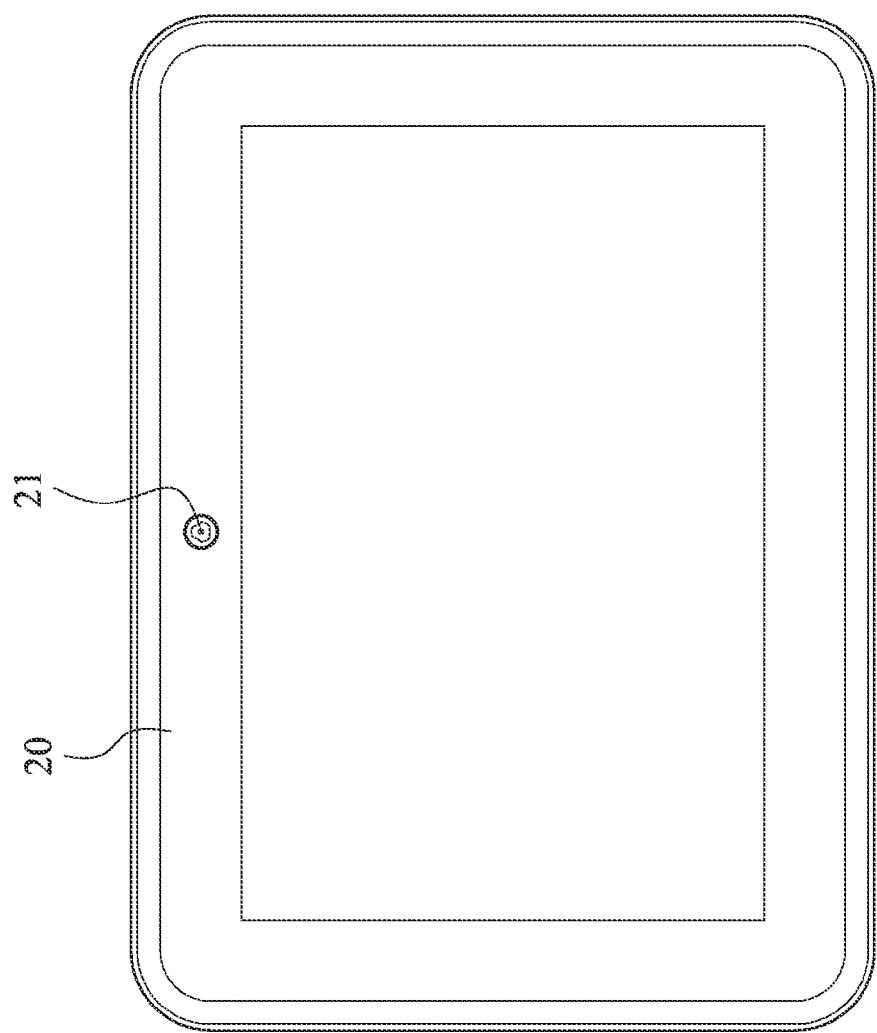
FIG. 18 is a schematic view of an electronic device according to the 10th embodiment of the present disclosure.

FIG. 18 is a schematic view of an electronic device 20 according to the 10th embodiment of the present disclosure. The electronic device 20 of the 10th embodiment is a tablet personal computer, wherein the electronic device 20 includes an image capturing device 21. The image capturing device 21 includes a photographing optical lens assembly (not otherwise herein labeled) according to the present disclosure and an image sensor (not otherwise herein labeled), wherein the image sensor is located at an image side of the photographing optical lens assembly.

11th Embodiment

Figure 19:
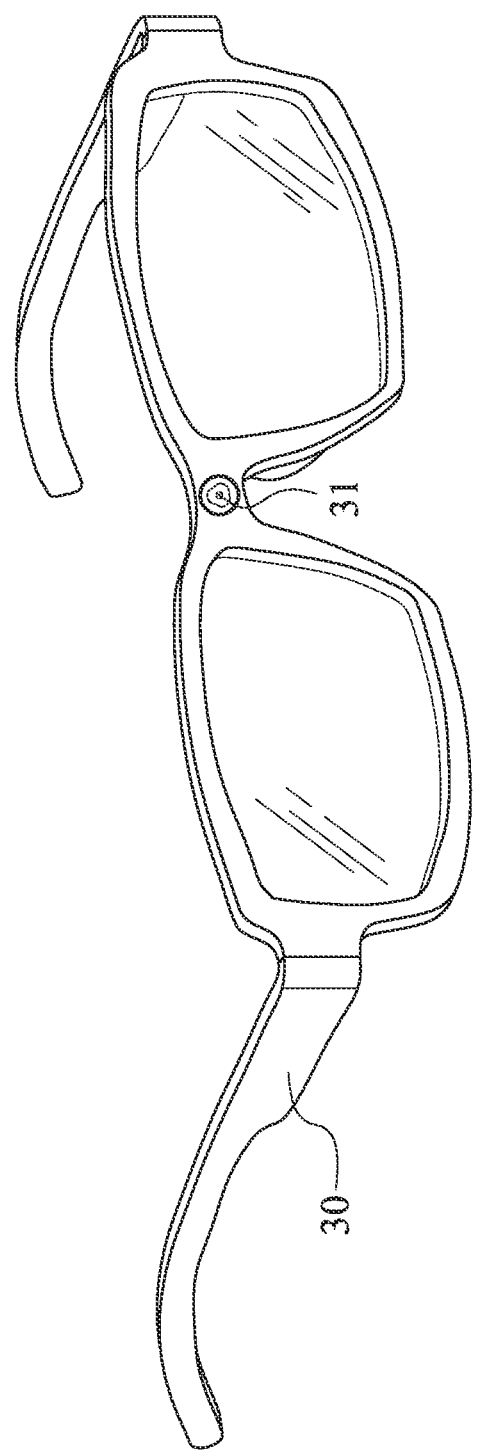
FIG. 19 is a schematic view of an electronic device according to the 11th embodiment of the present disclosure.

FIG. 19 is a schematic view of an electronic device 30 according to the 11th embodiment of the present disclosure. The electronic device 30 of the 11th embodiment is a head-mounted display (HMD), wherein the electronic device 30 includes an image capturing device 31. The image capturing device 31 includes a photographing optical lens assembly (not otherwise herein labeled) according to the present disclosure and an image sensor (not otherwise herein labeled), wherein the image sensor is located at an image side of the photographing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
    a first lens element with positive refractive power having an object-side surface being convex in a paraxial region thereof;
    a second lens element with negative refractive power having an image-side surface being concave in a paraxial region thereof;
    a third lens element with positive refractive power having an object-side surface being convex in a paraxial region thereof and an image-side surface being convex in a paraxial region thereof;
    a fourth lens element with refractive power having an object-side surface being convex in a paraxial region thereof and an image-side surface being concave in a paraxial region thereof, wherein the object-side surface and the image-side surface of the fourth lens element are aspheric; and
    a fifth lens element with refractive power having an object-side surface being convex in a paraxial region thereof, and an image-side surface being concave in a paraxial region thereof and having at least one convex shape in an off-axial region thereof, wherein the object-side surface and the image-side surface of the fifth lens element are aspheric;
    wherein, the photographing optical lens assembly has a total of five lens elements with refractive power, there is an air gap in a paraxial region between any two of the first lens element, the second lens element, the third lens element, the fourth lens element, and the fifth lens element that are adjacent to each other, the refractive power of the third lens element is stronger than the refractive power of the fifth lens element, a curvature radius of the object-side surface of the first lens element is R1, a curvature radius of the image-side surface of the second lens element is R4, a curvature radius of the object-side surface of the third lens element is R5, a curvature radius of the image-side surface of the third lens element is R6, a central thickness of the fourth lens element is CT4, a central thickness of the fifth lens element is CT5, an Abbe number of the fourth lens element is V4, and the following conditions are satisfied:

$$-1.0<(R5+R6)/(R5-R6)<0.20;$$

$$R4/R1<3.5;$$

$$CT5/CT4<1.75; \text{ and}$$

$$V4<35.$$

2. The photographing optical lens assembly of claim 1, wherein the curvature radius of the object-side surface of the first lens element is R1, the curvature radius of the image-side surface of the second lens element is R4, and the following condition is satisfied:

$$1.0<R4/R1<2.5.$$

3. The photographing optical lens assembly of claim 2, wherein an axial distance between the third lens element and the fourth lens element is T34, an axial distance between the fourth lens element and the fifth lens element is T45, and the following condition is satisfied:

$$3.0<T34/T45<15.$$

4. The photographing optical lens assembly of claim 2, wherein a curvature radius of the image-side surface of the fourth lens element is R8, a curvature radius of the object-side surface of the fifth lens element is R9, and the following condition is satisfied:

$$2.0<|R8|/R9.$$

5. The photographing optical lens assembly of claim 1, wherein a focal length of the photographing optical lens assembly is f, a focal length of the fourth lens element is f4, a focal length of the fifth lens element is f5, and the following condition is satisfied:

$$|f/f4|+|f/f5|<0.60.$$

6. The photographing optical lens assembly of claim 1, wherein an Abbe number of the third lens element is V3, and the following condition is satisfied:

$$V3<35.$$

7. The photographing optical lens assembly of claim 1, wherein the image-side surface of the fourth lens element has at least one convex shape in an off-axial region thereof.

8. The photographing optical lens assembly of claim 1, wherein the fourth lens element has negative refractive power.

9. The photographing optical lens assembly of claim 1, wherein an Abbe number of the second lens element is V2, an Abbe number of the third lens element is V3, the Abbe number of the fourth lens element is V4, an Abbe number of the fifth lens element is V5, and the following condition is satisfied:

$$80<V2+V3+V4+V5<145.$$

10. The photographing optical lens assembly of claim 1, wherein an off-axial region of the object-side surface of the third lens element is closer to the object side than a paraxial region of the object-side surface of the third lens element.

11. The photographing optical lens assembly of claim 1, wherein the curvature radius of the object-side surface of the third lens element is R5, the curvature radius of the image-side surface of the third lens element is R6, and the following condition is satisfied:

$$-1.0<(R5+R6)/(R5-R6)<0.$$

12. The photographing optical lens assembly of claim 1, wherein an axial distance between the second lens element and the third lens element is T23, a central thickness of the third lens element is CT3, and the following condition is satisfied:

$$T23/CT3<0.72.$$

13. An image capturing device, comprising:
the photographing optical lens assembly of claim 1; and
an image sensor, wherein the image sensor is located at the image side of the photographing optical lens assembly.

14. An electronic device, comprising:
the image capturing device of claim 13.

15. A photographing optical lens assembly comprising, in order from an object side to an image side:

a first lens element with positive refractive power having an object-side surface being convex in a paraxial region thereof;
a second lens element with negative refractive power having an image-side surface being concave in a paraxial region thereof;
a third lens element with positive refractive power having an object-side surface being convex in a paraxial region thereof and an image-side surface being convex in a paraxial region thereof;
a fourth lens element with refractive power having an object-side surface being convex in a paraxial region thereof and an image-side surface being concave in a paraxial region thereof; wherein the object-side surface and the image-side surface of the fourth lens element are aspheric; and
a fifth lens element with refractive power having an object-side surface being convex in a paraxial region thereof, and an image-side surface being concave in a paraxial region thereof and having at least one convex shape in an off-axial region thereof, wherein the object-side surface and the image-side surface of the fifth lens element are aspheric;
wherein, the photographing optical lens assembly has a total of five lens elements with refractive power, there is an air gap in a paraxial region between any two of the first lens element, the second lens element, the third lens element, the fourth lens element, and the fifth lens element that are adjacent to each other, a curvature radius of the object-side surface of the first lens element is R1, a curvature radius of the image-side surface of the second lens element is R4, a curvature radius of the object-side surface of the third lens element is R5, a curvature radius of the image-side surface of the third lens element is R6, a central thickness of the fourth lens element is CT4, a central thickness of the fifth lens element is CT5, an axial distance between the third lens element and the fourth lens element is T34, an axial distance between the fourth lens element and the fifth lens element id T45, an Abbe number of the second lens element is V2, an Abbe number of the third lens element is V3, an Abbe number of the fourth lens element is V4, an Abbe number of the fifth lens element is V5, and the following conditions are satisfied:

$$-1.0<(R5+R6)/(R5-R6)<0.20;$$

$$R4/R1<3.5;$$

$$CT5/CT4<1.75;$$

$$2.75<T34/T45; \text{ and}$$

$$80<V2+V3+V4+V5<145.$$

16. The photographing optical lens assembly of claim 15, wherein a curvature radius of the image-side surface of the fourth lens element is R8, a curvature radius of the object-side surface of the fifth lens element is R9, and the following condition is satisfied:

$$2.0<|R8|/R9.$$

17. The photographing optical lens assembly of claim 15, wherein a focal length of the photographing optical lens assembly is f, a focal length of the fourth lens element is f4, a focal length of the fifth lens element is f5, and the following condition is satisfied:

$$|f/f4|+|f/f5|<0.60.$$

18. The photographing optical lens assembly of claim 15, wherein the axial distance between the third lens element and the fourth lens element is T34, the axial distance between the fourth lens element and the fifth lens element id T45, and the following condition is satisfied:

$$3.0 < T34/T45 < 15.$$

19. The photographing optical lens assembly of claim 15, wherein a focal length of the photographing optical lens assembly is f, the curvature radius of the object-side surface of the third lens element is R5, the curvature radius of the image-side surface of the third lens element is R6, and the following condition is satisfied:

$$0 < (f/R5) - (f/R6) < 1.0.$$

20. The photographing optical lens assembly of claim 15, wherein an off-axial region of the object-side surface of the third lens element is closer to the object side than a paraxial region of the object-side surface of the third lens element.

21. The photographing optical lens assembly of claim 15, wherein an axial distance between the second lens element and the third lens element is T23, a central thickness of the third lens element is CT3, and the following condition is satisfied:

$$T23/CT3 < 0.72.$$

22. The photographing optical lens assembly of claim 15, wherein a focal length of the photographing optical lens assembly is f, and the following condition is satisfied:

$$2.5 \text{ mm} < f < 6.0 \text{ mm}.$$

23. An image capturing device, comprising:
the photographing optical lens assembly of claim 15; and
an image sensor, wherein the image sensor is located at the image side of the photographing optical lens assembly.

24. An electronic device, comprising:
the image capturing device of claim 23.

* * * * *